(12) United States Patent
Mori et al.

(10) Patent No.: US 7,113,293 B2
(45) Date of Patent: Sep. 26, 2006

(54) INFORMATION PROCESSING APPARATUS AND SYSTEM HAVING PREVIEW CONTROL, AND METHOD THEREOF, AND STORAGE MEDIUM STORING PROGRAM FOR IMPLEMENTING THE METHOD

(75) Inventors: Yasuo Mori, Kanagawa (JP); Koji Nakagiri, Kanagawa (JP); Satoshi Nishikawa, Kanagawa (JP)

(73) Assignee: Canon Kabushiki Kaisha, (JP)

( * ) Notice: Subject to any disclaimer, the term of this patent is extended or adjusted under 35 U.S.C. 154(b) by 727 days.

(21) Appl. No.: 10/198,726

(22) Filed: Jul. 17, 2002

(65) Prior Publication Data
US 2003/0030846 A1 Feb. 13, 2003

(30) Foreign Application Priority Data
Jul. 17, 2001 (JP) ............................. 2001-216482

(51) Int. Cl.
*G06F 3/12* (2006.01)
*G06F 15/00* (2006.01)
*G06K 1/00* (2006.01)

(52) U.S. Cl. .................... 358/1.13; 358/1.15; 358/400; 358/407; 715/527

(58) Field of Classification Search ............... 358/1.13, 358/1.15, 402, 407, 450; 715/517, 527
See application file for complete search history.

(56) References Cited

U.S. PATENT DOCUMENTS 5,832,298 A * 11/1998 Sanchez et al. ................. 710/8
6,084,687 A * 7/2000 Miyazaki et al. ............ 358/1.17
6,134,017 A * 10/2000 Schlank et al. ............. 358/1.15
6,616,702 B1 * 9/2003 Tonkin ........................ 715/515
2002/0184356 A1* 12/2002 Simpson et al. ............. 709/223
2004/0218226 A1* 11/2004 Antognini et al. .......... 358/402

* cited by examiner

*Primary Examiner*—Kimberly Williams
*Assistant Examiner*—Dillon J. Murphy
(74) *Attorney, Agent, or Firm*—Rossi, Kimms & McDowell, LLP

(57) ABSTRACT

There is provided an information processing apparatus, which enables cover sheets and original data to be previewed in the case where facsimile transmission data comprised of original data and cover sheets attached thereto is previewed before transmission thereof to a plurality of destinations in a manner not giving a sense of incompatibility to the conventional display method and operating method which are applied to preview of data in producing multiple prints. In a personal computer as the information processing apparatus, a spooler temporarily stores facsimile transmission data in an intermediate code format, and a despooler generates facsimile transmission data changed from the data stored in the intermediate code format. A printer driver attaches cover sheets to jobs and acquires drawing data of the cover sheets for the respective jobs, and a spool file manager controls preview display according to setting information acquired from the data stored in the intermediate code format and a preview method selected on a CRT.

16 Claims, 26 Drawing Sheets

TO MULTIFUNCTION APPARATUS 4000

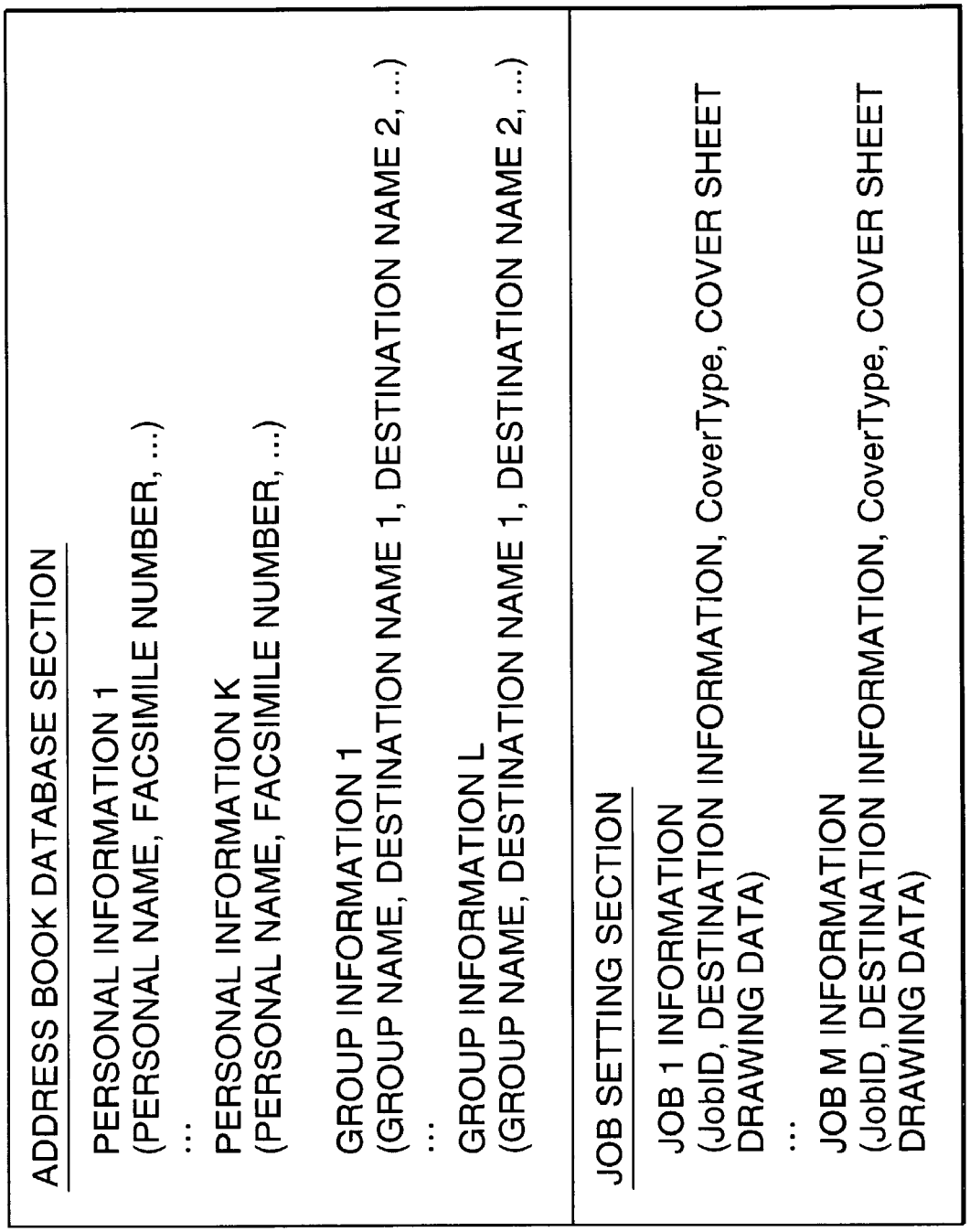

ADDRESS BOOK DATABASE SECTION

PERSONAL INFORMATION 1
(PERSONAL NAME, FACSIMILE NUMBER, ...)
:
PERSONAL INFORMATION K
(PERSONAL NAME, FACSIMILE NUMBER, ...)

GROUP INFORMATION 1
(GROUP NAME, DESTINATION NAME 1, DESTINATION NAME 2, ...)
:
GROUP INFORMATION L
(GROUP NAME, DESTINATION NAME 1, DESTINATION NAME 2, ...)

JOB SETTING SECTION

JOB 1 INFORMATION
(JobID, DESTINATION INFORMATION, CoverType, COVER SHEET DRAWING DATA)
:
JOB M INFORMATION
(JobID, DESTINATION INFORMATION, CoverType, COVER SHEET DRAWING DATA)

FIG. 11

| COVER SHEET SETTINGS | CoverType |
|---|---|
| NONE | 0 |
| SEND DIFFERENT SHEETS TO DESTINATIONS | 1 |
| SEND THE SAME SHEET TO ALL DESTINATIONS | 2 |

FIG. 12A

```
JOB SETTING INFORMATION SECTION
  JobID :              JOB IDENTIFIER
  Distination :        OUTPUT DESTINATION SETTING
  PaperSizeOption :    SHEET SIZE OPTION
  PaperSize :          SHEET SIZE
  ...
```

```
PAGE SETTING INFORMATION SECTION
[SETTING 1]
  DevModelD :          SHEET SETTING IDENTIFIER
  Paper :              SHEET SIZE
  Orientation :        SHEET ORIENTATION
  ...
[SETTING 2]
  DevModelD :          SHEET SETTING IDENTIFIER
  Paper :              SHEET SIZE
  Orientation :        SHEET ORIENTATION
  ...
```

```
DRAWING OBJECT INFORMATION SECTION
[PAGE1]
  DevModelD :          SHEET SETTING IDENTIFIER
  Record1,Record2,···
[PAGE2]
  DevModelD :          SHEET SETTING IDENTIFIER
  Record1,Record2,···
  ...
[OBJECTS]
  Font1,Font2,···
  Pen1,Pen2,···
  Brush1,Brush2,···
```

FIG. 12B

| PaperSizeOption | MEANING |
|---|---|
| 0 | SHEET SIZE OF EACH PAGE |
| 1 | SHEET SIZE OF TOP PAGE |
| 2 | SHEET SIZE DESIGNATED AS PaperSize |

| VARIABLE | MEANING |
|---|---|
| CoverType | 0: NONE |
| | 1: SEND DIFFERENT SHEETS TO DESTINATIONS |
| | 2: SEND THE SAME SHEET TO ALL DESTINATIONS |
| JobCopies | NUMBER OF DIVIDED JOBS |

FIG. 18

```
(JOB CONTROL SECTION)
OUTPUT=FAX          ; OUTPUT DESTINATION
DIAL=0300000001     ; TELEPHONE NUMBER
```

```
(DRAWING DATA SECTION)
JOB STARTING INSTRUCTION
INITIALIZING INSTRUCTION
PAGE STARTING INSTRUCTION
COVER SHEET DRAWING DATA
PAGE ENDING INSTRUCTION
PAGE STARTING INSTRUCTION
DRAWING INSTRUCTION 1
...
PAGE ENDING INSTRUCTION
...
JOB ENDING INSTRUCTION
```

FIG. 19A

```
COVER SHEET SETTING SECTION
  CoverPageOption:   COVER SHEET OPTION
  CoverPageSize:     COVER SHEET SIZE
  Template:          COVER SHEET TEMPLATE
  ...
```

```
DRAWING OBJECT SECTION
  Object1,Object2,···
```

FIG. 19B

| CoverPageOption | MEANING |
|---|---|
| 0 | SHEET SIZE OF TOP PAGE |
| 1 | SHEET SIZE DESIGNATED AS CoverPageSize |

INFORMATION PROCESSING APPARATUS AND SYSTEM HAVING PREVIEW CONTROL, AND METHOD THEREOF, AND STORAGE MEDIUM STORING PROGRAM FOR IMPLEMENTING THE METHOD

BACKGROUND OF THE INVENTION

1. Field of the Invention

This invention relates to an information processing apparatus, an information processing system, a preview control method, and a storage medium that stores a program for implementing the method, and more particularly to an information processing apparatus, an information processing system, and a preview control method which can be suitably applied to broadcast communication in which the same data is transmitted to a plurality of destinations by the information processing apparatus, attachment of cover sheets to original data, and edition of original data and cover sheets in a system comprised of the information processing apparatus such as a personal computer and an image processing apparatus having a facsimile communicating function, and a storage medium that stores a program for implementing the method.

2. Description of the Related Art

Conventionally, information processing apparatuses are known which have a preview function of displaying transmission data to be printed by a printing apparatus on a display so that a user can review the data before transmission thereof. The transmission data is usually previewed as one-copy data irrespective of the number of prints produced from one page. The reason why the transmission data is previewed as one-copy data is that the same printing process as in one-copy printing in which the same page is printed in one copy is merely repeated in multiple-copy printing in which one page is printed in a plurality of copies so that confirmation of date for one copy suffices. Another reason is that preview of the transmission data as one-copy data prevents a user from being confused by a change in the number of previewed pages according to the number of prints.

The above prior art, however, has a problem as described below. A cover sheet is usually attached to transmission data in the case where data supplied from an information processing apparatus to an apparatus having a data transmitting function is transmitted to a destination via a communication medium. The prior art has a problem encountered when a cover sheet is thus attached to transmission data. Namely, when the same data is transmitted by broadcast communication, i.e. transmitted to a plurality of destinations, there is a case that the same original data are transmitted to destinations while different cover sheets are attached to the original data according to the destinations.

The case that different cover sheets according to destinations are transmitted includes, for example, a case where destination names are put on the cover sheets. In this case, the same data is not repeatedly transmitted to the destinations, but different cover sheets are attached to the data according to the destinations. That is, different data are transmitted to the respective destinations by adding cover sheet data to transmission data. The prior art cannot deal with this case, and only transmission data is previewed irrespective of the contents of cover sheets as is the case with multiple-page printing, and therefore, the entire data comprised of transmission data and cover sheets cannot be reviewed before transmission thereof.

SUMMARY OF THE INVENTION

It is therefore an object of the present invention to provide an information processing apparatus, an information processing system, and a preview control method, which enable cover sheets and text data to be previewed in the case where facsimile transmission data comprised of text data and cover sheets attached thereto is previewed before transmission thereof to a plurality of destinations in a manner not giving a sense of incompatibility to the conventional display method and operating method which are applied to preview of data in producing multiple prints, and a storage medium storing a program for implementing the method.

To attain the above object, in a first aspect of the present invention, there is provided an information processing apparatus capable of supplying jobs to an image processing apparatus having at least a facsimile communicating function, comprising a job generating unit that generates jobs to be supplied to the image processing apparatus, a cover sheet attaching unit that attaches cover sheets to the jobs, a drawing data acquiring unit that acquires drawing data of the cover sheets for respective ones of the jobs, a selector that selects a method of previewing facsimile transmission data that constitutes the jobs and is to be transmitted by the image processing apparatus, and the cover sheets attached by the cover sheet attaching unit, a preview unit that previews the facsimile transmission data and the cover sheets, and a preview display controller that controls preview display of the preview unit according to the method of previewing selected by the selector.

In a preferred form of the first aspect, the information processing apparatus comprises a spool unit that temporarily stores facsimile transmission data to be supplied to the image processing apparatus in an intermediate code format, and a despool unit that generates final facsimile transmission data to be supplied to the image forming apparatus, from the data temporarily stored in the intermediate code format, and the preview display controller controls preview display of the preview unit according to setting information acquired from the data stored in the intermediate code format and the method of previewing selected by the selector.

Preferably, the selector is capable of selecting the facsimile transmission data or the cover sheets or both the facsimile transmission data and the cover sheets to be previewed, and the preview display controller controls preview display of the preview unit according to the method of previewing selected by the selector.

In a preferred embodiment of the first aspect, the preview display controller comprises a data changing unit that changes cover sheets to be displayed according to destinations when different cover sheets are attached to the facsimile transmission data according to the destinations by the cover sheet attaching unit, and the preview display controller controls preview display of the preview unit to change and display the cover sheets according to the destinations using the data changing unit.

In an alternative preferred embodiment of the first aspect, the preview display controller comprises a data changing unit that changes cover sheets to be displayed according to destinations when different cover sheets are attached to the facsimile transmission data according to the destinations by the cover sheet attaching unit, and the preview display controller controls preview display of the preview unit to change and display pairs of the cover sheets and the facsimile transmission data according to the destinations using the data changing unit.

According to the information processing apparatus of the first aspect of the present invention, cover sheets are attached to jobs to be supplied to the information processing apparatus, drawing data of cover sheets to be attached to the respective jobs is acquired, a method of previewing facsimile transmission data, which constitute the jobs and is to be transmitted, and the attached cover sheets is selected, and preview display is controlled according to the selected method of previewing. Therefore, the following effects can be obtained:

According to the prior art, only transmission data is previewed irrespective of the contents of cover sheets, but according to the present invention, in the case where cover sheets are attached to facsimile transmission data, the cover sheets and the facsimile transmission data can be previewed before transmission thereof.

In a preferred form of the information processing apparatus, facsimile transmission data to be transmitted to the image processing apparatus is temporarily stored in an intermediate code format, facsimile transmission data is generated from the data temporarily stored in the intermediate code format, cover sheets are attached to jobs, drawing data of the cover sheets attached to the respective jobs are acquired, and control is provided such that the facsimile transmission data and the cover pages are previewed according to the selected preview method and setting information acquired from the intermediate code format data. Therefore, the following effects can be obtained:

In the case where facsimile transmission data with cover sheets attached thereto are previewed before they are transmitted from the information processing apparatus to a plurality of destinations, the cover sheets and the facsimile transmission data (text data) can be previewed in a manner not giving a sense of incompatibility to the conventional display method and operating method used for previewing printing data in producing multiple prints.

To attain the above object, in a second aspect of the present invention, there is provided an information processing system including an image processing apparatus having at least a facsimile communicating function, and an information processing apparatus capable of supplying jobs to the image processing apparatus, the information processing apparatus comprising a job generating unit that generates jobs to be supplied to the image processing apparatus, a cover sheet attaching unit that attaches cover sheets to the jobs, a drawing data acquiring unit that acquires drawing data of the cover sheets for respective ones of the jobs, a selector that selects a method of previewing facsimile transmission data that constitutes the jobs and is to be transmitted by the image processing apparatus, and the cover sheets attached by the cover sheet attaching unit, a preview unit that previews the facsimile transmission data and the cover sheets, and a preview display controller that controls preview display of the preview device according to the method of previewing selected by the selector.

In a preferred form of the information processing system according to the second aspect, the information processing apparatus comprises a spool unit that temporarily stores facsimile transmission data to be supplied to the image processing apparatus in an intermediate code format, and a despool unit that generates final facsimile transmission data to be supplied to the image forming apparatus, from the data temporarily stored in the intermediate code format, and wherein the preview display controller of the information processing apparatus controls preview display of the preview unit according to setting information acquired from the data stored in the intermediate code format and the method of previewing selected by the selector.

Preferably, in the information processing system according to the second aspect, the selector of the information processing apparatus is capable of selecting the facsimile transmission data or the cover sheets or both the facsimile transmission data and the cover sheets to be previewed, and wherein the preview display controller of the information processing apparatus controls preview display of the preview device according to the method of previewing selected by the selector.

In a preferred embodiment of the information processing system according to the second aspect, the preview display controller of the information processing apparatus comprises a data changing unit that changes cover sheets to be displayed according to destinations when different cover sheets are attached to the facsimile transmission data according to the destinations by the cover sheet attaching unit, and the preview display controller controls preview display of the preview unit to change and display the cover sheets according to the destinations using the data changing unit.

In an alternative preferred embodiment of the information processing system according to the second aspect, the preview display controller of the information processing apparatus comprises a data changing unit that changes cover sheets to be displayed according to destinations when different cover sheets are attached to the facsimile transmission data according to the destinations by the cover sheet attaching unit, and the preview display controller controls preview display of the preview unit to change and display pairs of the cover sheets and the facsimile transmission data according to the destinations using the data changing unit.

According to the information processing system of the second aspect of the present invention, substantially the same effects as the effects obtained by the first aspect described above can be obtained.

To attain the above object, in a third aspect of the present invention, there is provided a preview control method executed by an information processing apparatus capable of supplying jobs to an image processing apparatus having at least a facsimile communicating function, comprising a job generating step of generating jobs to be supplied to the image processing apparatus, a cover sheet attaching step of attaching cover sheets to the jobs, a drawing data acquiring step of acquiring drawing data of the cover sheets for respective ones of the jobs, a selecting step of selecting a method of previewing facsimile transmission data that constitutes the jobs and is to be transmitted by the image processing apparatus and the cover sheets attached in the cover sheet attaching step, a previewing step of previewing the facsimile transmission data and the cover sheets, and a preview display control step of controlling preview display in the previewing step according to the method of previewing selected in the selecting step.

In a preferred form of the preview control method according to the third aspect, the method comprises a spooling step of temporarily storing facsimile transmission data to be supplied to the image processing apparatus in an intermediate code format, and a despooling step of generating final facsimile transmission data to be supplied to the image processing apparatus, from the data temporarily stored in the intermediate code format, and wherein the preview display control step comprises controlling preview display in the previewing step according to setting information acquired from the data stored in the intermediate code format and the method of previewing selected in the selecting step.

Preferably, in the preview control method according to the third aspect, in the selecting step, the facsimile transmission data or the cover sheets or both the facsimile transmission data and the cover sheets can selected to be previewed, and in the preview display control step, preview display provided in the preview step is controlled according to the method of previewing selected in the selecting step.

In a preferred embodiment of the preview control method according to the third aspect, the preview display control step comprises a data changing step of changing cover sheets to be displayed according to destinations when different cover sheets are attached to the facsimile transmission data according to destinations in the cover sheet attaching step, and wherein in the preview display control step preview display is controlled to change and display the cover sheets according to the destinations using the data changing step.

In an alternative preferred embodiment of the preview control method according to the third aspect, the preview display control step comprises a data changing step of changing cover sheets to be displayed according to destinations in a case where different cover sheets are attached to the facsimile transmission data according to destinations in the cover sheet attaching step, and wherein in the preview display control step preview display of the preview device is controlled to change and display pairs of the cover sheets and the facsimile transmission data according to the destinations using the data changing step.

According to the preview control method of the third aspect, substantially the same effects as those obtained by the first aspect described above can be obtained.

To attain the above object, in a fourth aspect of the present invention, there is provided a computer-readable storage medium containing a program for executing a preview control method applied to an information processing apparatus capable of supplying jobs to an image processing apparatus having at least a facsimile communicating function, the preview control method comprising a job generating step of generating jobs to be supplied to the image processing apparatus, a cover sheet attaching step of attaching cover sheets to the jobs, a drawing data acquiring step of acquiring drawing data of the cover sheet for respective ones of the jobs, a selecting step of selecting a method of previewing facsimile transmission data that constitutes the jobs and is to be transmitted by the image processing apparatus, and the cover sheets attached in the cover sheet attaching step, a previewing step of previewing the facsimile transmission data and the cover sheets, and a preview display control step of controlling preview display provided in the previewing step according to the method of previewing selected in the selecting step.

In a preferred form of the storage medium according to the fourth aspect, the preview control method comprises a spooling step of temporarily storing facsimile transmission data to be supplied to the image processing apparatus in an intermediate code format, and a despooling step of generating final facsimile transmission data to be supplied to the image forming apparatus, from the data temporarily stored in the intermediate code format, and wherein the preview display control step comprises controlling preview display in the previewing step according to setting information acquired from the data stored in the intermediate code format and the method of previewing selected in the selecting step.

In a preferred form of the storage medium according to the fourth aspect, in the selecting step, the facsimile transmission data or the cover sheets or both the facsimile transmission data and the cover sheets can be selected to be previewed, and in the preview display control step, preview display provided in the previewing step is controlled according to the method of previewing selected in the selecting step.

Preferably, in the storage medium according to the fourth aspect, the preview display control step comprises a data changing step of changing cover sheets to be displayed according to destinations when different cover sheets are attached to the facsimile transmission data according to destinations in the cover sheet attaching step, and wherein in the preview display control step preview display is controlled to change and display the cover sheets according to the destinations using the data changing step.

In a preferred embodiment of the storage medium according to the fourth aspect, the preview display control step comprises a data changing step of changing cover sheets to be displayed according to destinations in a case where different cover sheets are attached to the facsimile transmission data according to destinations in the cover sheet attaching step, and in the preview display control step preview display of the preview device is controlled to change and display the cover sheets according to the destinations using the data changing step.

In an alternative preferred embodiment of the storage medium according to the fourth aspect, the preview display control step comprises a data changing step of changing cover sheets to be displayed according to destinations in a case where different cover sheets are attached to the facsimile transmission data according to destinations in the cover sheet attaching step, and in the preview display control step preview display is controlled to change and display pairs of the cover sheets and the facsimile transmission data according to the destinations using the data changing step.

According to the storage medium of the fourth aspect, substantially the same effects as those obtained by the first aspect described above can be obtained.

The above and other objects of the invention will become more apparent from the following drawings taken in conjunction with the accompanying drawings.

BRIEF DESCRIPTION OF THE DRAWINGS

FIG. 7 is a diagram showing a window for setting facsimile transmission;

FIG. 10 is a diagram showing the contents of a facsimile information file;

FIG. 11 is a diagram showing cover sheet attachment setting parameters;

FIGS. 12A and 12B is a diagram showing the contents of a spool file;

FIG. 18 is a diagram showing data that is generated by the printer driver;

FIGS. 19A and 19B is a diagram showing cover sheet information;

FIGS. 20A and 20B are diagrams showing a method of expanding and reducing drawing data, wherein:

FIG. 20A shows how drawing data is expanded; and

FIG. 20B shows how drawing data is reduced;

DETAILED DESCRIPTION OF THE PREFERRED EMBODIMENTS

The present invention will now be described in detail with reference to the drawings showing a preferred embodiment thereof.

Before describing an embodiment of the present invention, a description will be given of the summary of the present invention. The present invention enables a user to select a proper display format and display object data in previewing facsimile transmission data comprised of original data and a cover sheet attached thereto, and therefore enables the cover sheet and the original data to be previewed in a format that does not confuse the user.

Figure 4:
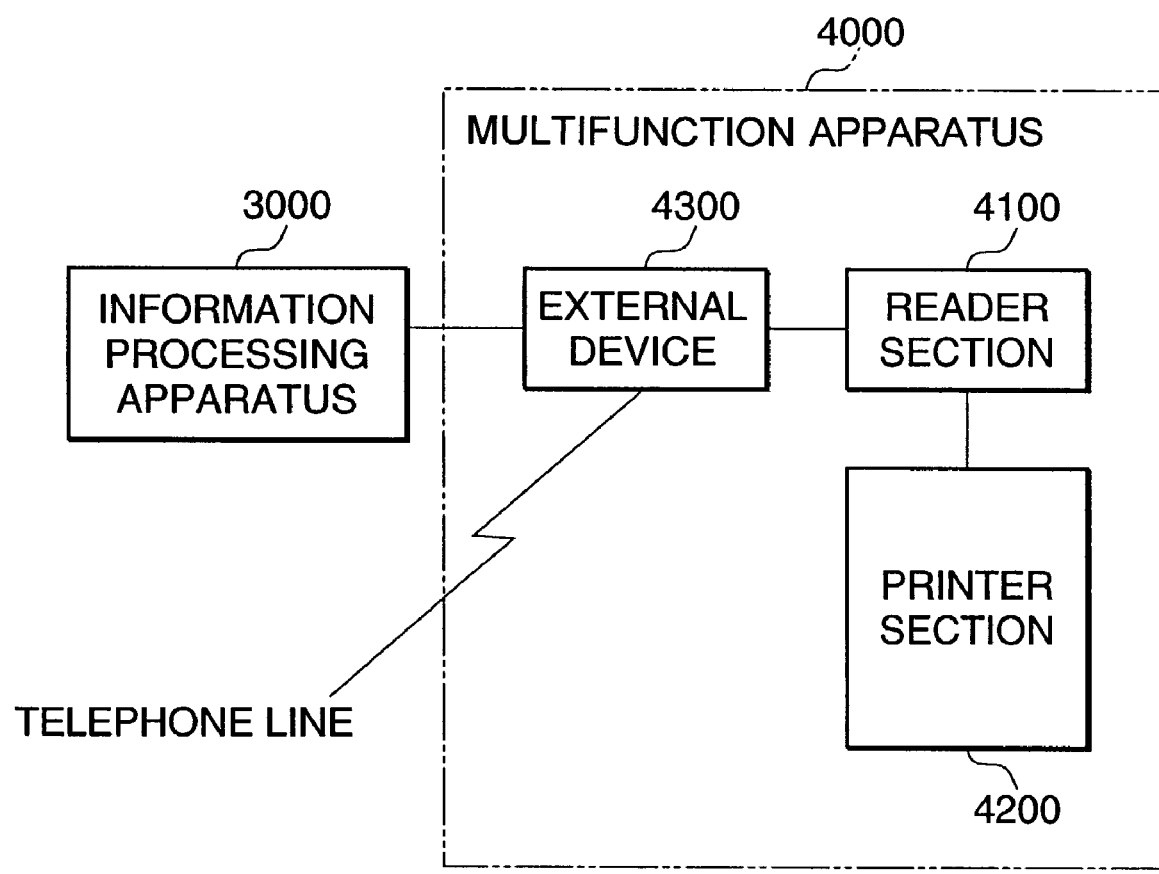
FIG. 4 is a block diagram showing the whole arrangement of the information processing system.

FIG. 4 is a block diagram showing the whole arrangement of the information processing system according to an embodiment of the present invention. The information processing system is comprised of a personal computer 3000 as an information processing apparatus; and a multifunction apparatus 4000 as an image processing apparatus that includes a reader section 4100, printer section 4200 which has a printing function of printing an image based on a data from the information processing apparatus, external communication device (hereinafter referred to as "external device") 4300 which has a facsimile communicating function in a body.

In further detail, the personal computer 3000 transmits facsimile transmission image data, which is to be transmitted via facsimile by the multifunction apparatus 4000, to the multifunction apparatus 4000. The details of construction of the personal computer 3000 will be described with reference to FIG. 1 and other figures. In the multifunction apparatus 4000, the reader section 4100 is an image input device that reads images on originals and transmits image data to the printer section 4200, the information processing apparatus or a facsimile apparatus and so on. The printer section 4200 is comprised of an image output device that includes transfer sheet stacking sections for a plurality of types of transfer sheets (recording sheet cassettes) and forms image data as visible images on transfer sheets in response to printing instructions. The external device 4300 is electrically connected to the reader section 4100 and connectable to a telephone line, and has various kinds of functions as described later. The external device 4300 will be described later in further detail with reference to FIG. 6.

Figure 5:
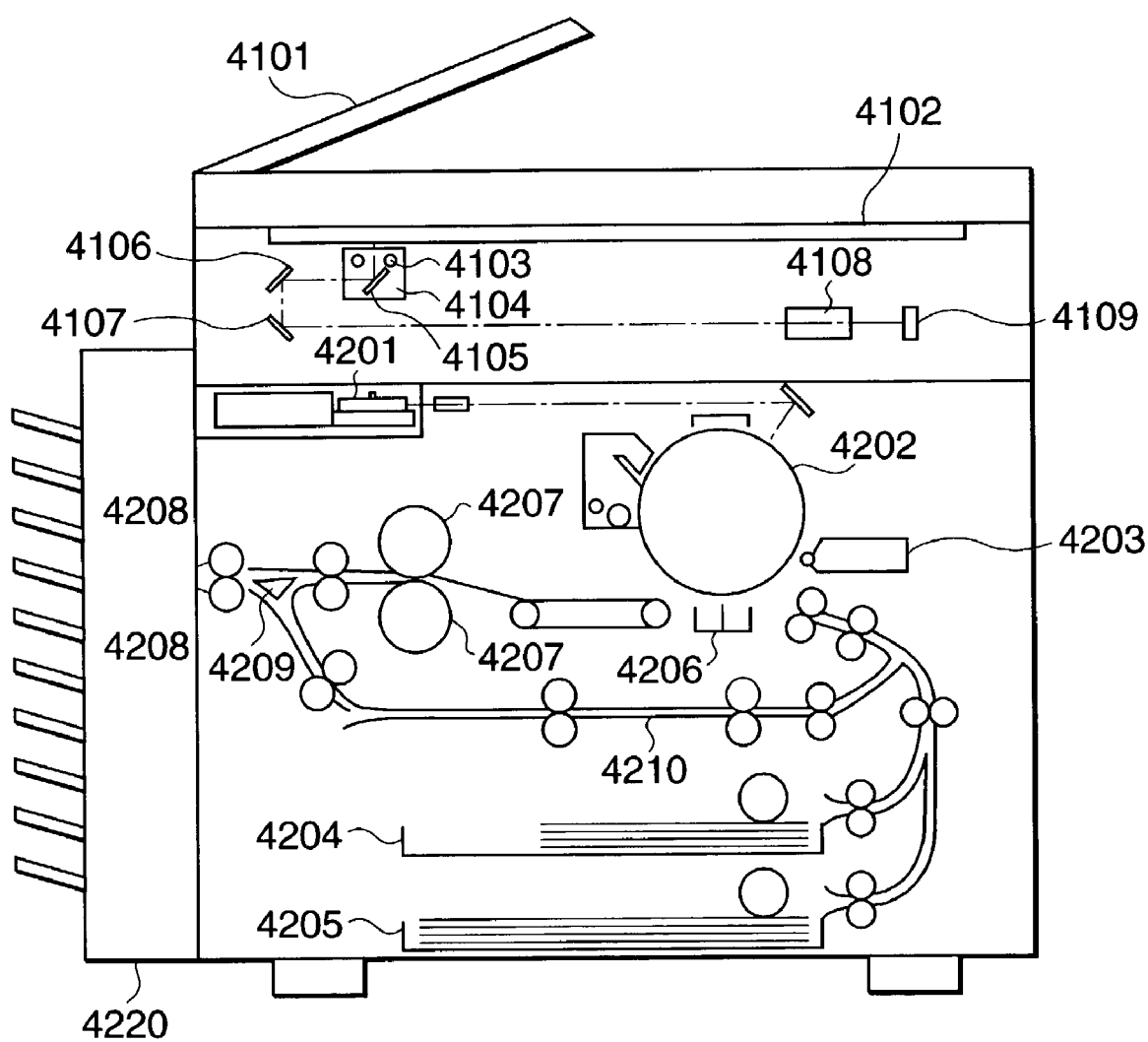
FIG. 5 is a diagram showing the internal construction of a reader and a printer of a multifunction apparatus in the information processing system.

FIG. 5 is a diagram showing the internal construction of the reader section 4100 and the printer section 4200 of the multifunction apparatus 4000. The reader section 4100 is comprised of a document feeder 4101, an original platen glass 4102, a scanner unit 4104 including a lamp 4103 and a mirror 4105, a mirror 4106, a mirror 4107, a lens 4108, and a CCD image sensor (hereinafter referred to as "CCD") 4109. The printer section 4200 is comprised of an exposure control section 4201, a photosensitive body 4202, a developer 4203, transfer sheet stacking sections 4204 and 4205, a transfer section 4206, a fixing section 4207, a sheet discharge section 4208, a conveying direction switching member 4209, and a refeed transfer sheet stacking section 4210. In FIG. 5, reference numeral 4220 denotes a sorter that has a plurality of bins and is attached to the printer section 4200.

The construction of the reader section 4100 and the printer section 4200 as well as the operation thereof will now be described in further detail. First, originals stacked on the document feeder 4101 are sequentially conveyed one by one onto the original platen glass 4102. If each original has reached a predetermined position of the original platen glass 4102, the lamp 4103 of the scanner unit 4104 is turned on and the scanner unit 4104 moves horizontally as viewed in FIG. 5 to scan the original by exposure. Light reflected on the original is inputted to the CCD 4109 via the mirrors 4105, 4106, 4107, and the lens 4108. The reader section 4100 then transmits a corresponding image signal to the printer section 4200.

The image signal inputted from the reader section 4100 to the printer section 4200 is then converted into a modulated luminous signal by the exposure control section 4201, and the luminous signal radiates the photosensitive body 4202. The developer 4203 then develops a latent image formed on the photosensitive body 4202 by the radiation light. A transfer sheet is conveyed from the transfer sheet stacking section 4204 or the transfer section stacking section 4205 in proper timing according to the leading end of the developed image, and the developed image is transferred onto the transfer sheet by the transfer section 4206. The image transferred onto the transfer sheet is fixed on the transfer sheet by the fixing section 4207, and is discharged to the sorter 4220 attached to the printer section 4200.

Transfer sheets with images thus fixed discharged to the sorter 4220 by the discharge section 4208 are discharged to respective bins when the sorter 4220 is functioning, and the transfer sheets are discharged onto the top bin when the sorter 4220 is not functioning. When images read sequentially by the reader section 4100 are to be formed on both sides of one transfer sheet and outputted, the transfer sheet fixed by the fixing section 4207 is once conveyed to the discharge section 4208 and is then switched in conveying direction, so that the transfer sheet is conveyed to the refeed transfer sheet stacking section 4210 via the conveying direction switching member 4209. When the next original is set, an image on the original is read in the above-described manner, but two original images can be printed on both sides of one transfer sheet since the transfer sheet is fed from the refeed transfer sheet stacking section 4210.

Figure 6:
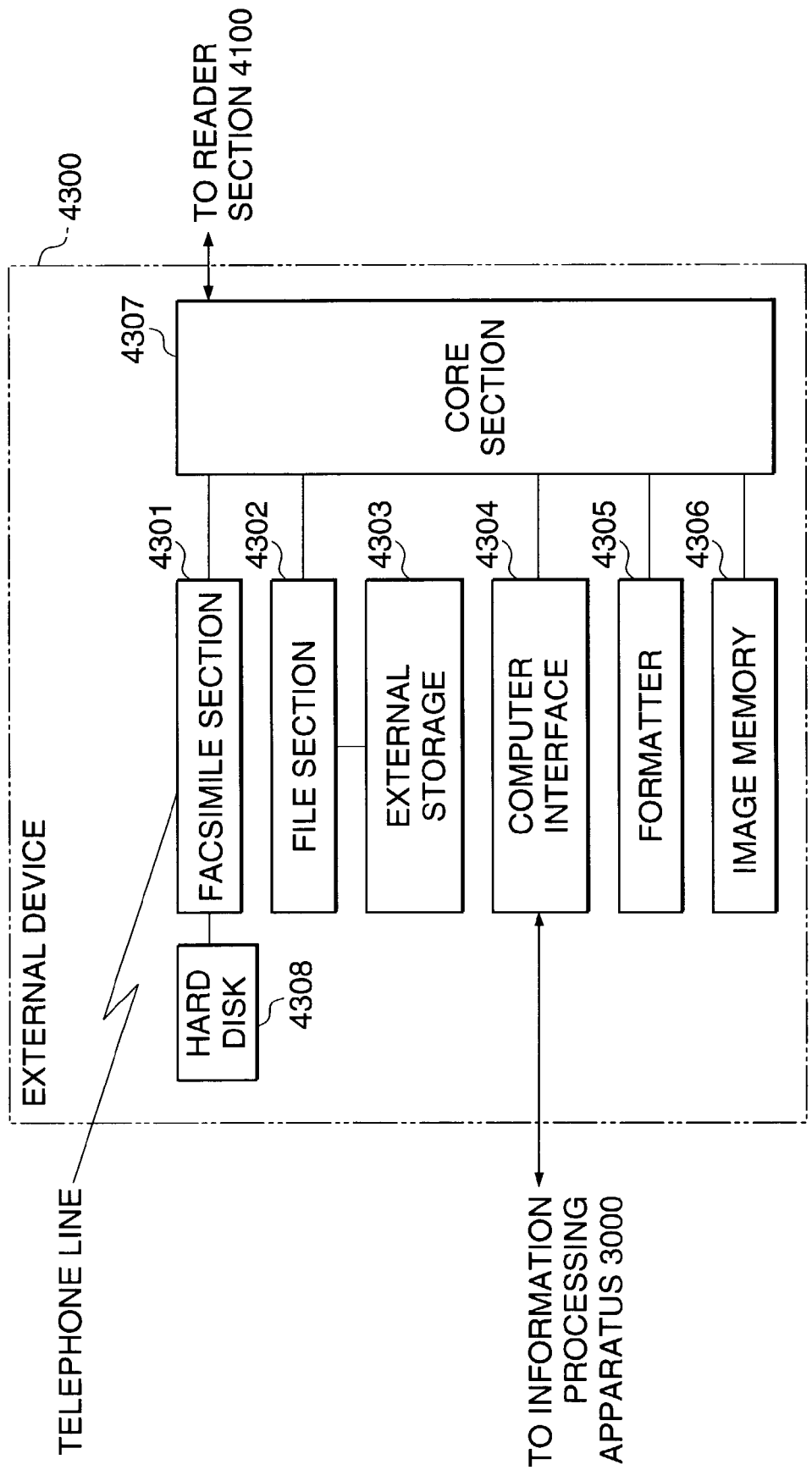
FIG. 6 is a block diagram showing the arrangement of an external device of the multifunction apparatus.

FIG. 6 is a block diagram showing the construction of the external device 4300 of the multifunction apparatus 4000 in the information processing system according to the present embodiment. The external device 4300 is comprised of a facsimile section 4301, a file section 4302, an external storage 4303, a computer interface 4304, a formatter 4305, an image memory 4306, a core section 4307, and a hard disk drive 4308.

A detailed description will now be given of the construction of the external device 4300. The external device 4300 is a device that is connected to the reader section 4100 in the multifunction device 4000 and communicates with an external apparatus or device outside the multifunction apparatus 4000. The core section 4307 in the external device 4300 provides control of signals and various functions. In the external device 4300, the facsimile section 4301 sends and receives data to and from the multifunction apparatus 4000 by facsimile communication through a telephone line. The file section 4302 converts various information on originals read by the reader section 4100 into electric signals, and stores them on the external storage 4303 (e.g. magneto-optical disk).

The formatter 4305 expands code information transmitted from the personal computer (information processing apparatus) 3000 into image information. The computer interface 4304 provides interface between the external device 4300 and the personal computer 3000. The image memory 4306 stores information outputted from the reader section 4100 and temporarily stores information transmitted from the personal computer 3000. The core section 4307 controls respective functions of the above-mentioned component parts. The hard disk 4308 stores various kinds of information.

Figure 1:
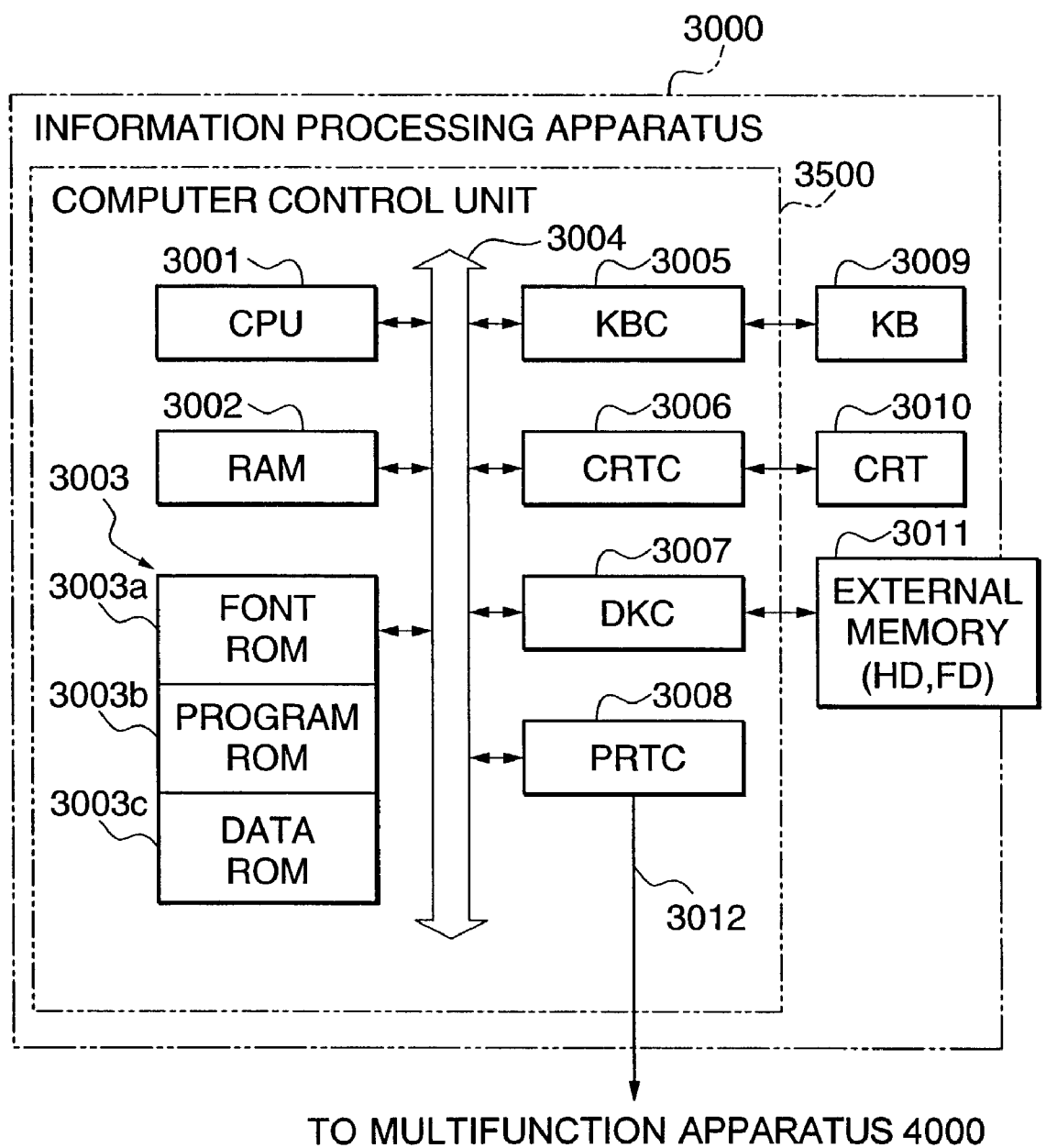
FIG. 1 is a block diagram showing the construction of an information processing apparatus in an information processing system according to an embodiment of the present invention.

FIG. 1 is a block diagram showing the construction of the personal computer 3000 as the information processing apparatus in the information processing system according to the present embodiment. The personal computer 3000 is comprised of a CPU 3001, a RAM 3002, a ROM 3003, a system bus 3004, a keyboard controller (KBC) 3005, a CRT controller (CRTC) 3006, a disk controller (DKC) 3007, a printer controller (PRTC) 3008, a keyboard (KB) 3009, a CRT display (CRT) 3010, an external memory 3011, and a bi-directional interface 3012.

In further detail, the CPU 3001 is a central processing unit that provides overall control of devices connected to the system bus 3004, and performs processing of documents including figures, images, characters, tables (e.g. spreadsheets), and the like according to a document processing program or the like stored in a program ROM 3003*b* of the ROM 3003, described later, or in the external memory 3011. The CPU 3001 also rasterizes outline fonts on a display information RAM set on the RAM 3002 for example, and thus enables WYSWYG on the CRT display 3010 (What You See Is What You Get: a function of printing out original exactly in size and form that appear on the CRT display screen).

Further, the CPU 3001 opens a variety of windows registered based on commands specified by a mouse cursor, not shown, on the CRT display 3010 to perform a variety of data processing. When printing by means of the multifunction apparatus 4000, a user can open a window for setting as to printing on the CRT display 3010 of the personal computer 3000 to set a printing method to be executed by a printer driver, such as setting of the multifunction apparatus 4000 and selection of a printing mode. In the same manner, the user can open a window for setting as to an instruction for transmitting facsimile transmission data when the CPU 3001 causes the multifunction apparatus 4000 to carry out facsimile transmission. Whether the multifunction apparatus 4000 carries out printing or facsimile transmission depends on whether an instruction for printing or an instruction for facsimile transmission (with designation of a destination) is finally inputted to the multifunction apparatus 4000. In the following description, printing control and facsimile transmission control will be treated as identical control. The CPU 3001 performs processing shown in flow charts, described later, in accordance with programs stored in the program ROM 3003*b* of the ROM 3003.

The RAM 3002 functions as a main memory of the CPU 3001 and a work area for operations of the CPU 3001. The ROM 3003 is comprised of a font ROM 3003*a*, a program ROM 3003*b*, and a data ROM 3003. The font ROM 3003*a* or the external memory 3011 stores font data for use in the document processing described above. The program ROM 3003*b* or the external memory 3011 stores an operating system (hereinafter referred to as "OS") as a control program for operations of the CPU 3001 and others. The data ROM 3003*c* or the external memory 3011 stores a variety of data for use in the document processing described above and the like.

The keyboard controller (KBC) 3005 controls key inputs from the keyboard 3009 and a pointing device, not shown. The CRT controller (CRTC) 3006 controls display of the CRT display (CRT) 3010. The disk controller (DKC) 3007 controls access to the external memory 3011. The printer controller (PRTC) 3008 is connected to the multifunction apparatus 4000 via the bi-directional interface 3012 to provide control of communication with the multifunction apparatus 4000. The keyboard 3009 includes a set of keys for inputting a variety of data and instructions.

The CRT display (CRT) 3010 displays figures, image characters, tables, and the like. The external memory 3011 is comprised of a hard disk (HD), floppy (registered trademark) disk (FD), and the like, and stores a boot program, a variety of application softwares (hereinafter referred to as simply "applications"), font data, user files, editing files, a printer control command generating program (hereinafter referred to as "printer driver"), and the like.

The above described CPU 3001, RAM 3002, ROM 3003, keyboard controller (KBC) 3005, CRT controller (CRTC) 3006, and disk controller (DKC) 3007, printer controller (PRTC) 3008 are arranged on a computer control unit 3500 in the personal computer 3000.

Figure 2:
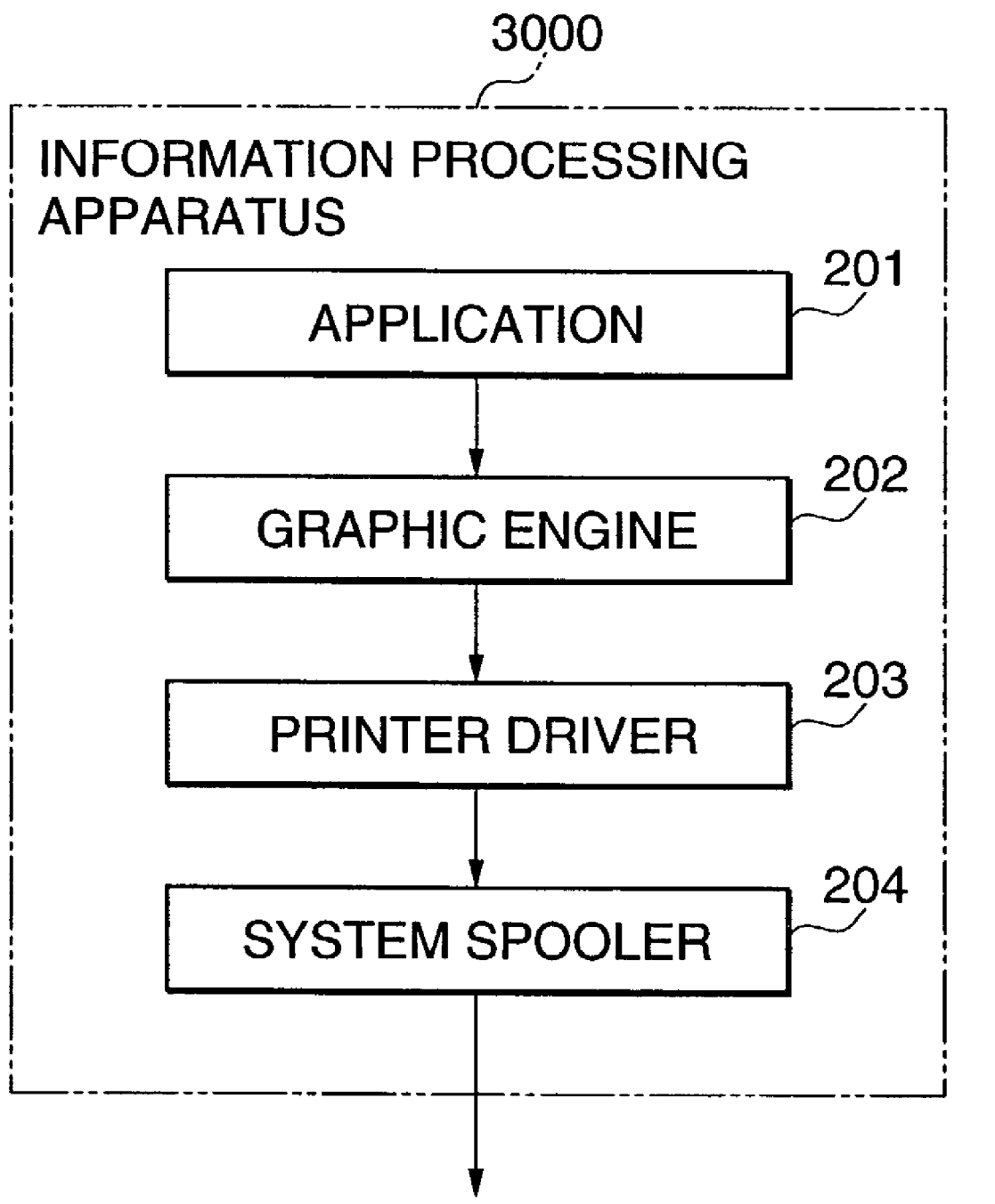
FIG. 2 is a block diagram showing the arrangement of a typical printing process control system of the information processing apparatus in the information processing system according to the embodiment.

FIG. 2 is a block diagram showing the arrangement software of a typical printing control system of the personal computer 3000 as the information processing apparatus, to which is directly connected or connected via a network the multifunction apparatus 4000 as the image information apparatus. The printing control system of the personal computer 3000 is comprised of an application 201, a graphic engine 202, a printer driver 203, and a system spooler 204.

In further detail, the application 201, graphic engine 202, printer driver 203, and system spooler 204 are stored as files in the external memory 3011 in FIG. 1, and they are program modules loaded into the RAM 3002 and executed according to the OS or a module using a module of the OS. The application 201 and the printer driver 203 can be added to a FD and a CD-ROM as the external memory 3011 or to a HD as the external memory 3011 via a network, not illustrated.

A description will now be given of the procedure of operations of printing a document (an original data) prepared by a user using the application 201 (ex. a word processing application) by the multifunction apparatus 4000. First, the user instructs the OS to start the application 201. The OS loads the application 201, stored in the external memory 3011, into the RAM 3002 to start the application 201. The user then prepares a document on the application 201 or opens an existing document and makes settings on a printer selection window provided by the OS or the application to select an apparatus that prints out the document (or an apparatus that transmits the document by facsimile communication).

The user then instructs the application 201 to make settings as to printing of the document. The application 201 transmits this instruction to the graphic engine 202, and the graphic engine 202 loads the printer driver 203 corresponding to the selected apparatus from the external memory 3011 into the RAM 3002, and instructs the printer driver 203 to display a printing setting window. The printer driver 203 displays the setting window in response to this instruction. The user makes a variety of settings on this window, and the printer driver 203 returns specified setting information (hereinafter referred to as "DEVMODE") to the application 201 via the graphic engine 202.

The user then instructs the application 201 to print the document. The application 201 initializes the printer driver 203 by means of the above acquired DEVMODE via the graphic engine 202 so as to inform the printer driver 203 of the settings as to printing. The application 201 then issues a printing instruction to the graphic engine 202 via GDI (Graphic Device Interface), and the graphic engine 202 converts the received printing instruction into DDI (Device Driver Interface) to issue a printing instruction to the printer driver 203.

The printer driver 203 converts the DDI received from the graphic engine 202 into a control command in PDL (Page Description Language), for example, which can be recognized by the multifunction apparatus 4000 and other image processing apparatuses. The resulting control command is outputted as print data to the multifunction apparatus 4000 via the bi-directional interface 3012 by way of the system spooler 204 loaded in the RAM 3002 of the personal computer 3000 by the OS. This enables facsimile transmission of images processed in the same manner as print data, and therefore improves the processing efficiency and the operability.

A detailed description will now be given of the characteristic construction and operation of the personal computer 3000 in the information processing system that is comprised of the multifunction apparatus 4000 having the above-mentioned facsimile communicating function and the personal computer 3000. The personal computer 3000 according to the present embodiment that controls the multifunction apparatus 4000 has not only the construction shown in FIGS. 1 and 2 but also a construction as shown in FIG. 3 that printing data from the application 201 is temporarily spooled in the form of intermediate code data.

Figure 3:
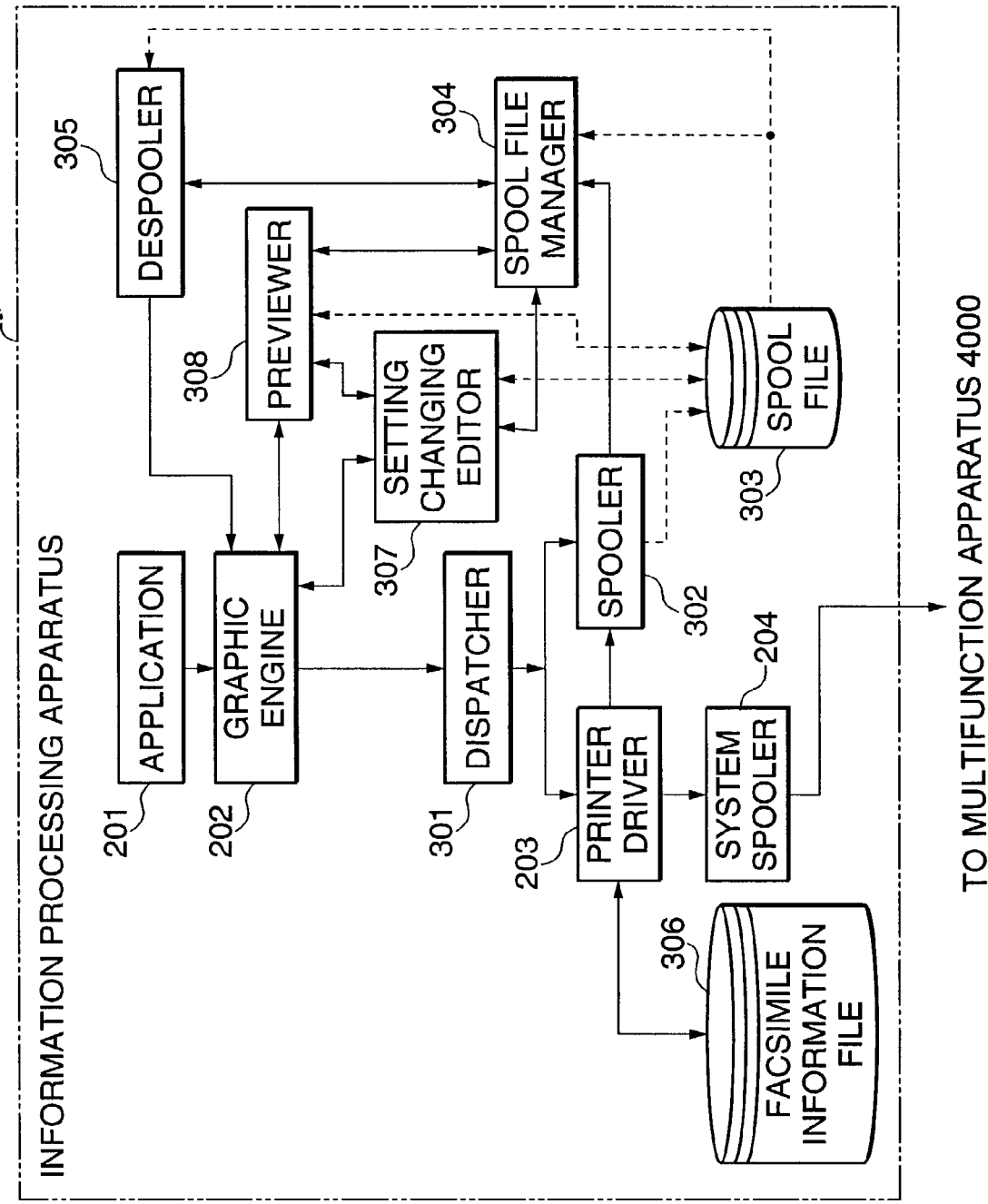
FIG. 3 is a block diagram showing details of the arrangement of the printing process control system.

FIG. 3 is a block diagram showing in details the construction of the printing control system of the personal computer 3000, in particular, showing an arrangement that realizes expanded functions relative to the functions realized by the arrangement shown in FIG. 2, i.e. an arrangement in which a spool file 303 comprised of intermediate codes is temporarily generated when a printing instruction is transmitted from the graphic engine 202 to the printer driver 203. The personal computer 3000 is comprised of the application 201, graphic engine 202, printer driver 203, system spooler 204, dispatcher 301, spooler 302, spool file 303, spool file manager 304, despooler 305, facsimile information file 306, setting change editor 305, and previewer 308.

A description will now be given of functions of essential parts of the printing control system according to the present embodiment in FIG. 3. The spooler 302 temporarily stores facsimile transmission data, which is to be transmitted to the multifunction apparatus 4000, in an intermediate code format in the spool file 303. The despooler 305 generates final facsimile transmission data to be transmitted to the multifunction apparatus 4000, from the data temporarily stored in the intermediate code format. The printer driver 203 attaches cover sheets to jobs (facsimile transmission data), and acquires drawing data of the cover sheets for the respective jobs. The previewer 308 is capable of previewing the facsimile transmission data and the cover sheets. The spool file manager 304 controls preview display of the previewer 308 according to the setting information acquired from the intermediate code format data and a preview method selected on the CRT 3010. Details of the arrangement of FIG. 3 will be described later.

In the system shown in FIG. 3, processing is performed on the data stored in the spool file 303, and the actual printing of the multifunction apparatus 4000 is controlled based on the data processed by the despooler 305. This realizes a variety of functions not possessed by the application 201, such as a function of adding cover sheets to print data supplied from the application 201, a function of repeatedly transmitting data to a plurality of destinations, a function of changing the size of cover sheets, a function of expanding and reducing facsimile transmission data (original data) to which are attached cover sheets, or a function of performing processing according to destinations of outputs from the multifunction apparatus 4000 (printed out, facsimile transmission, and storage in a hard disk).

The construction and operation of the system in FIG. 3 will now be described in further detail. When the user instructs the application 201 to print (facsimile transmission of print data), the application 201 issues an instruction for starting printing (GDI: StartDoc) to the dispatcher 301 via the graphic engine 202. The dispatcher 301 calls setting windows provided by the printer driver 203. The printer driver 203 displays the setting windows shown in FIGS. 7 to 9 on the CRT 3010.

Figure 7:
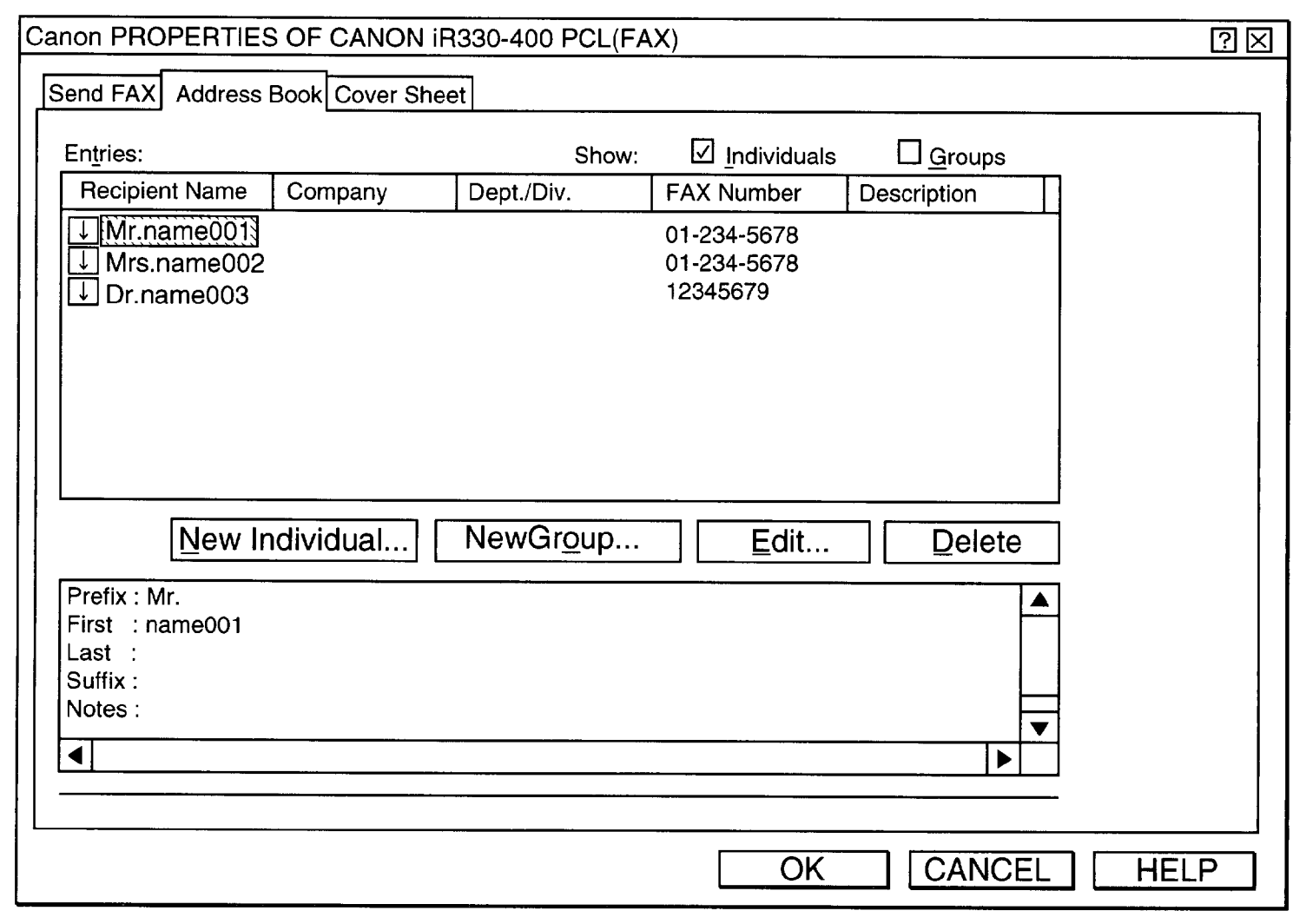

FIG. 7 is a diagram useful in explaining an address book editing window displayed on the CRT 3010 of the personal computer 3000. On the address book editing window, individuals and groups can be defined as destinations and registered in an address book database.

Figure 8:
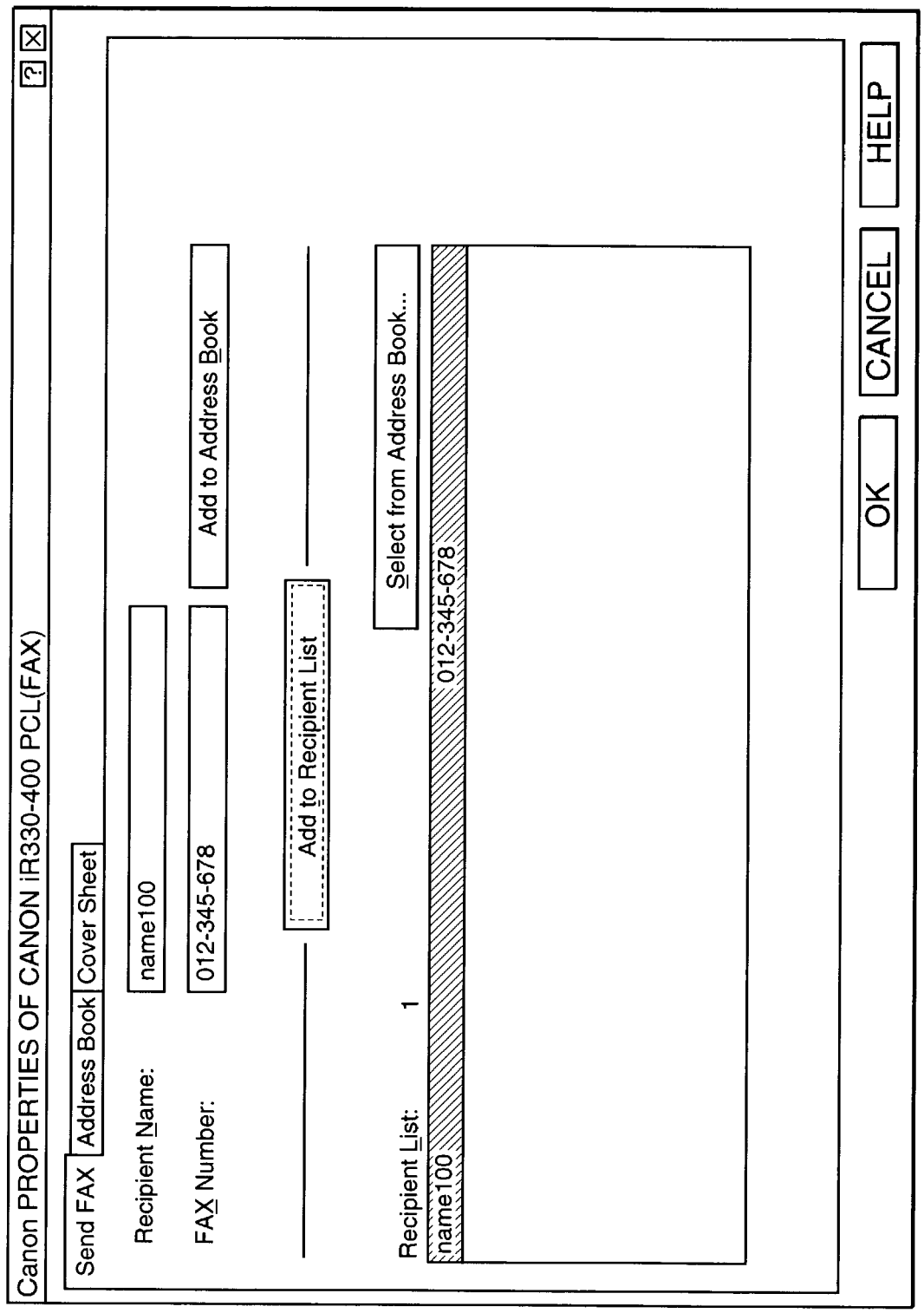
FIG. 8 is a diagram showing another window for setting facsimile transmission.

FIG. 8 is a diagram useful in explaining a transmission setting window displayed on the CRT 3010 of the personal computer 3000. A document is transmitted by facsimile communication to a destination designated on the transmission setting window. On the transmission setting window, new destinations or individuals and groups registered in advance in the address book database can be designated as destinations, and new destinations can be added to the address book.

Figure 9:
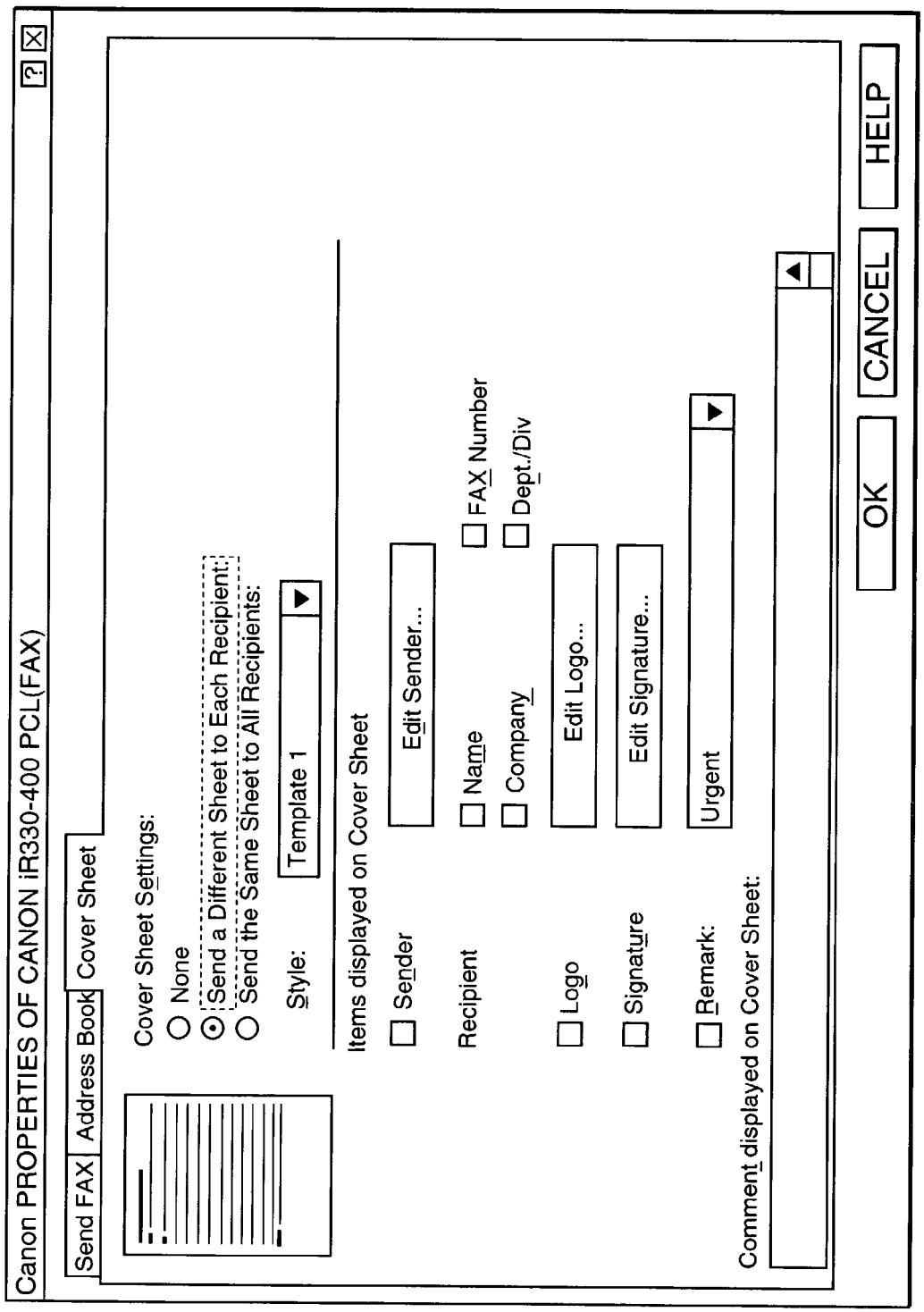
FIG. 9 is a diagram showing still another window for setting facsimile transmission.

FIG. 9 is a diagram useful in explaining a cover sheet setting window for use in setting cover sheets to be attached to facsimile transmission data (original data) in facsimile transmission. The cover sheet setting window is displayed on the CRT 3010 of the personal computer 3000. As a method of attaching cover sheets to the facsimile transmission data, one is selected from the following: "no cover sheet is attached to facsimile transmission data", "different cover sheets for respective destinations are attached to facsimile transmission data", and "the same cover sheet for all the destinations is attached to facsimile transmission data". In attaching cover sheets to facsimile transmission data, the type and contents of cover sheet can be set. It should be noted that a cover sheet is attached to the head of a job (facsimile transmission data).

If the user completes the settings on the windows in FIGS. 7 to 9 and then presses "OK" buttons to close the windows, the printer driver 203 updates the address book database, and spools the settings as to cover sheets and transmission in the facsimile information file 306 for every job.

FIG. 10 is a diagram useful in explaining information spooled in the facsimile information file 306 of the personal computer 3000. The information spooled in the facsimile information file 306 is comprised of an address book database section (personal information and group information) and a job setting section (job information). The personal information is each comprised of a personal name, facsimile number, and the like, and the group information is each comprised of a group name, a destination name, and the like. The job information is each comprised of a job ID (JobID), destination information, cover type (CoverType), cover sheet drawing data, and the like.

The personal information and the group information are stored in the address book database section, and can be displayed, added, edited, and deleted via the address book editing window in FIG. 7. New personal information may be added via the transmission setting window in FIG. 8. In the job setting section, destinations specified on the transmission setting window in FIG. 8 and the settings as to cover sheets specified on the cover sheet window in FIG. 9 are stored for each job.

For setting as to the cover sheets, a value as shown in FIG. 11 is stored as the cover type (Cover Type) of information on each job. Namely, a value "0" is stored as the cover type if no cover sheet is attached to facsimile transmission data, a value "1" is stored as the cover type if facsimile transmission data with different cover sheets attached thereto are transmitted to respective destinations, a value "2" is stored as the cover type if facsimile transmission data with the same cover sheet attached thereto are transmitted to all destinations. The job ID (JobID) is set as an identifier for each job so as to store the above setting for each job.

Subsequently to the issuance of the instruction for starting printing (GDI: StartDoc), the application 201 sequentially issues an instruction for starting a page (GDI: StartPage), an instruction for drawing an object included in the page, and an instruction for ending the page (GDI: EndDoc) to the dispatcher 301 via the graphic engine 202. The dispatcher 301 determines whether DDI received from the graphic engine 202 is one converted from GDI issued by the application 201 by the graphic engine 202 or one converted from GDI issued by the despooler 305 by the graphic engine 202. If the GDI is one issued from the application 201 to the graphic engine 202, the dispatcher 301 loads the spooler 302 stored in the external memory 3011 into the RAM 3002, and issues a printing instruction to the spooler 302.

Figure 21:
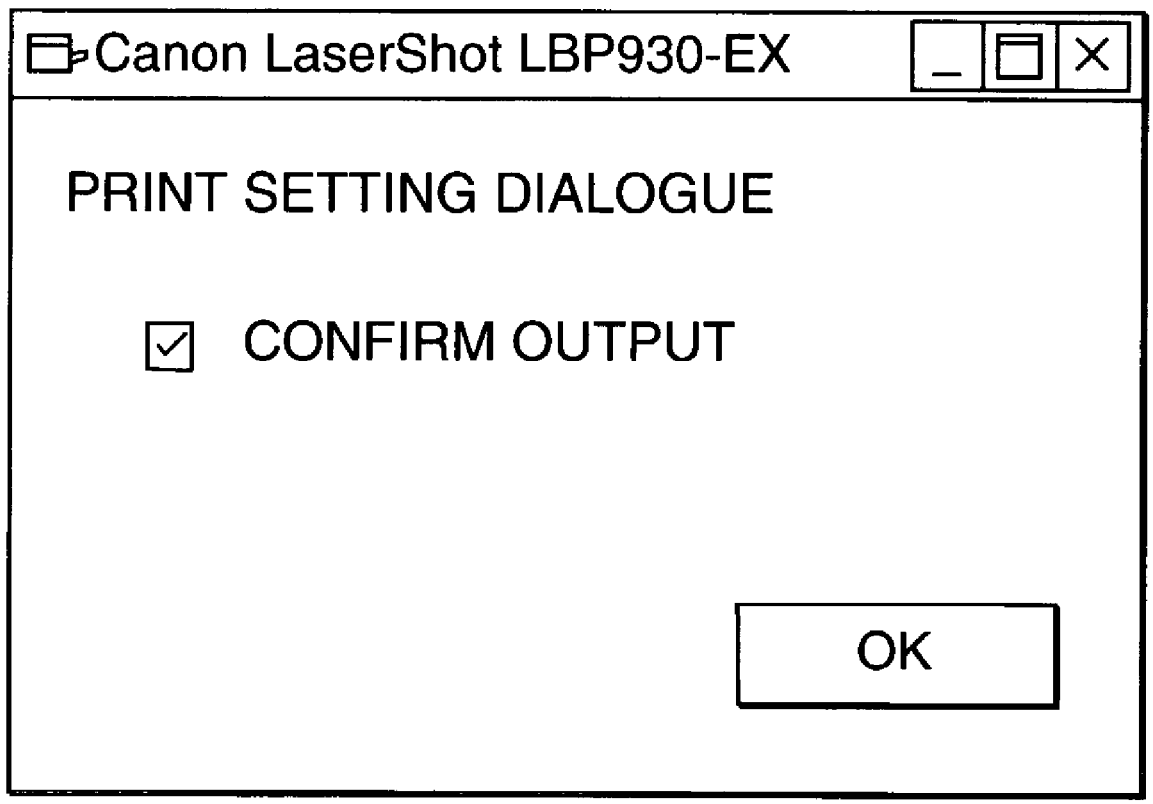
FIG. 21 is a diagram showing a GUI screen that sets preview.

FIG. 3 also shows an arrangement in which the previewer 308 is provided in the above described expanded function arrangement. Preview is realized as follows: Setting as to whether preview is to be carried out is included in settings as to processing of printing data stored in the spool file 303. The spool file manager 304 reads in the settings as to processing, and if preview has been designated, determines whether preview is to be carried out or not, according to the contents of settings as to processing of printing data stored in the spool file 303. Further, whether preview is to be carried out or not can be also set by providing a user interface screen as shown in FIG. 21, for example.

If the spool file manager 304 determines that preview can be carried out using the graphic engine 202, the spool file manager 304 loads the previewer 308 stored in the external memory 3011 into the RAM 3002, and gives an instruction for previewing an intermediate code written in the spool file 303. The previewer 308 processes the intermediate code included in the spool file 303 according to the settings as to processing stored in the spool file 303, and outputs the processed data to a client region thereof by means of the graphic engine 202. This enables output of an image onto the screen of the CRT 3010.

The graphic engine 202 is capable of carrying out proper rendering according to the designated output destination. Accordingly, as is the case with the despooler 305, the previewer 308 processes the intermediate code included in the spool file 303 according to the settings as to processing stored in the spool file 303 and outputs the image onto the screen of the CRT 3010 by means of the graphic engine 202 to realize preview.

If the settings as to processing of print data included in the spool file 303 are previewed on the display of the CRT 3010 by the previewer 308, the multifunction apparatus 4000 is requested to print the print data or facsimile the print data by the user using the previewer 308. The spool file manager 304 is notified of the request, and prints or transmits by facsimile the print data by means of the multifunction apparatus 4000 under the control of the printing control system in FIG. 3. The previewer 308 terminates the preview after the multifunction apparatus 4000 is requested to print or facsimile the print data.

Further, the user may carry out corrections while reviewing the output contents displayed on the screen of the CRT 3010 using the previewer 308. These correction are realized by processing the contents of the spool file 303 by the previewer 308 as required. After the corrections are carried out, if the multifunction apparatus 4000 is requested to print or transmit by facsimile the data, the spool file manager 304 and the despooler 305 carry out the printing or facsimile transmission by means of the multifunction apparatus 4000 according to the processed contents of the spool file 303.

FIGS. 12A and 12B is a diagram useful in explaining information spooled in the spool file 303 of the personal computer 3000. A job setting information section is comprised of JobID that identifies a job, and Destination that represents an output destination selected from a plurality of destinations (printed out, facsimile transmission, storage in a hard disk, and the like). Further, the job setting information section includes PaperSizeOption representing a sheet size option, and PaperSize representing a sheet size.

A page setting information section stores setting information relating to pages (e.g. page setting identifier, sheet size, and sheet orientation) included in a job. If the same settings are made for all pages, setting information relating to only one page is stored, and if different settings are made for one job, setting information corresponding to the number of different settings is stored.

A drawing object information section has spooled therein a page setting identifier (DevModeID) as setting information for each page, information on all drawing records included in each page (e.g. the type and output positions of records), and information on objects used by the drawing records (e.g. fonts, pens, and brushes). DevModeID indicates any one of the page settings stored in the page setting information section.

The spooler 302 generates the spool file 303 separately for every print job executed by the application 201. The spooler 302 converts the received print data into intermediate codes, and stores them for every job in the drawing object information section of the spool file 303. The spooler 302 also stores setting information as to print data set for each job or page by the application 201 in the job setting information section and the page setting information section of the spool file 303. Although the spool file 303 is generated as a file on the external memory 3011, this is not limitative, but the spool file 303 may be generated on the RAM 3002.

The spooler 302 also loads the spool file manager 304 stored in the external memory 3011 into the RAM 3002, and notifies the spool file manager 304 of a progress in generation of the spool file 303 (start/end of a job, and start/end of a page).

Figures 13, 14:
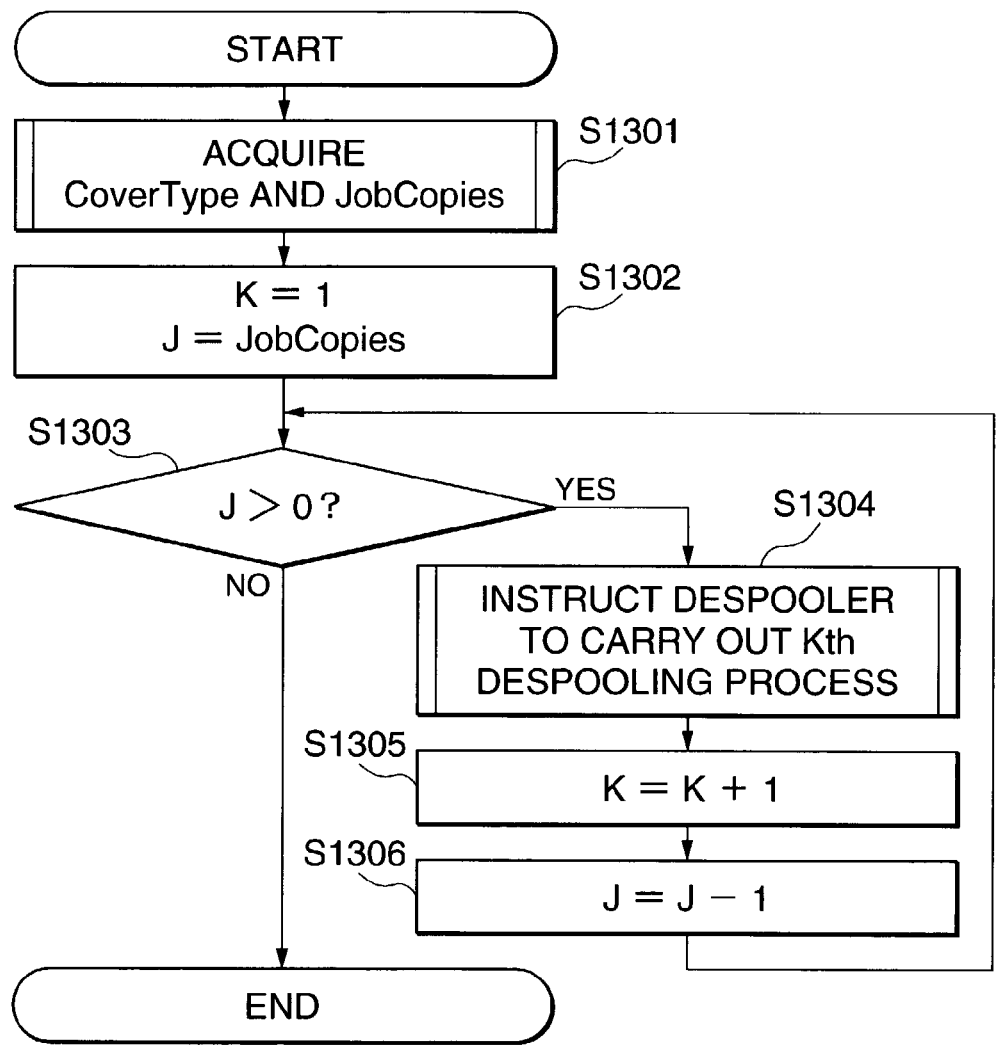
FIG. 13 is a flow chart showing the procedure of operations performed by a spool file manager of the information processing apparatus.
FIG. 14 is a diagram showing the contents of data that is acquired from a printer driver by the spool file manager.

FIG. 13 is a flow chart of processing performed by the spool file manager 304 of the personal computer 3000. The CPU 3001 causes the printing control system in FIG. 3 to execute the processing of this flow chart according to a program stored in the program ROM 3003b of the ROM 3003. In a step S1301, the spool file manager 304 acquires CoverType representing a setting relating to attachment of cover sheets to facsimile transmission data, and JobCopies representing the total number of divided jobs from the printer driver 203. FIG. 14 shows the acquired data and meanings thereof. In FIG. 14, CoverType "0" means that "no cover sheet is attached to facsimile transmission data", CoverType "1" means that "facsimile transmission data with different cover sheets attached thereto are transmitted to respective destinations", and CoverType "2" means that "facsimile transmission data with the same cover sheet attached thereto are transmitted to all destinations". In a step S1302, a variable K representing the number of times of despooling counted is initialized to 1, and a variable J is initialized to a value of JobCopies. In steps S1303 to S1306, the present processing is repeated such that despooling in the step S1304 is carried out the number of times corresponding to the total number of divided jobs (JobCopies), and is terminated if the despooling in the step S1304 has been repeated the number of times corresponding to the total number of divided jobs (JobCopies).

Figure 15:
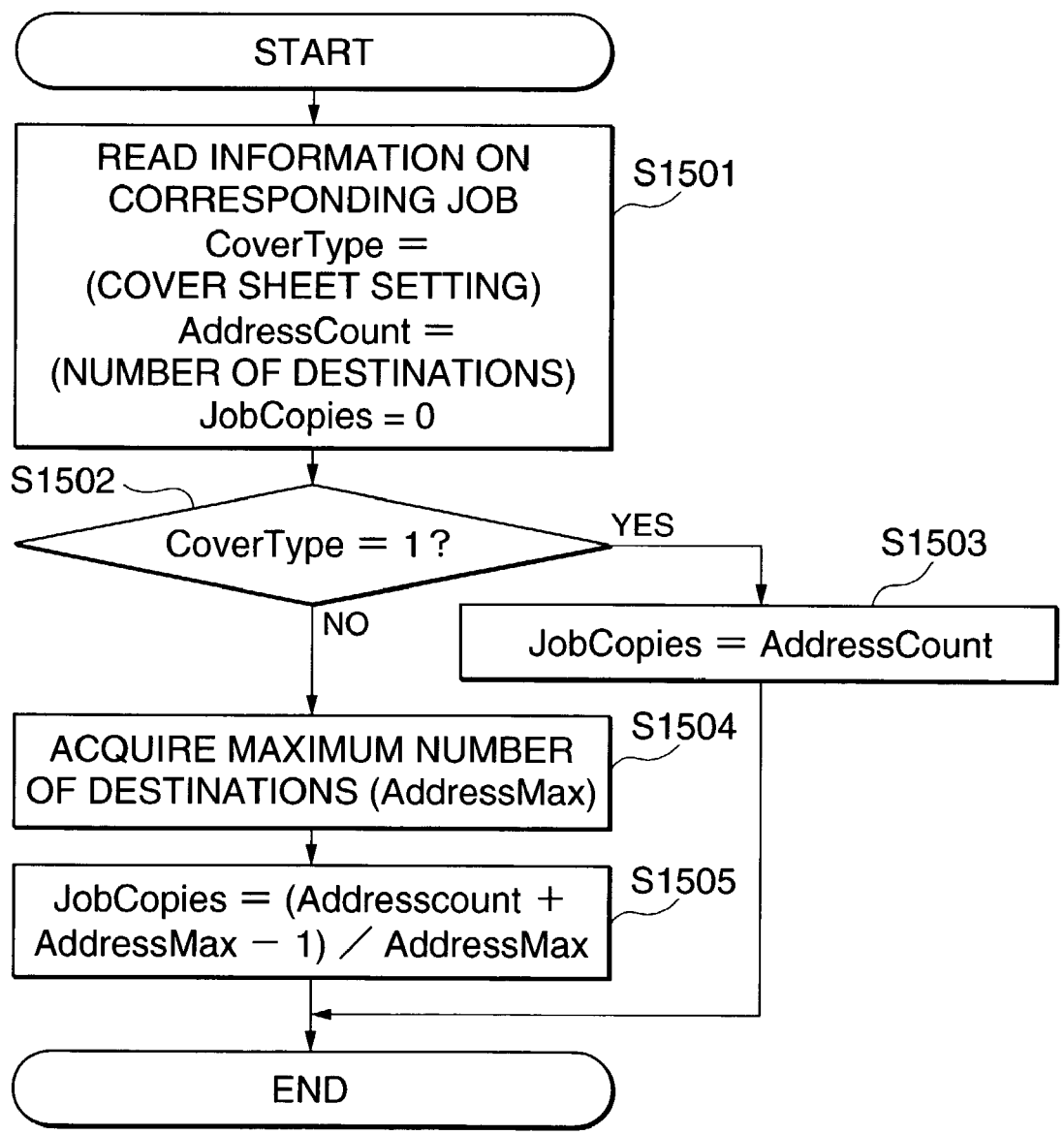
FIG. 15 is a flow chart showing the procedure of operations performed by the printer driver.

FIG. 15 is a flow chart of processing performed by the printer driver 201 to calculate CoverType representing the setting as to attachment of cover sheets to facsimile transmission data and JobCopies representing the total number of divided jobs acquired in the step S1301 in FIG. 13. The CPU 3001 causes the printing control system in FIG. 3 to execute the processing of this flow chart according to a program stored in the program ROM 3003b of the ROM 3003. In a step S1501, information on the corresponding job is read from the job setting section in the facsimile information file 306 (refer to FIG. 10), and CoverType and AddressCount are initialized. AddressCount is a numerical value representing the total number of destinations, which is the sum of the number of personal addresses included in the destination information and the number of individuals in each group included in the destination information. The total number of divided jobs as JobCopies that should be calculated is initialized to 0.

In a step S1502, it is checked whether CoverType is set to 1 (i.e. facsimile transmission data with different cover sheets attached thereto are transmitted to respective destinations) or not. If CoverType is set to 1 in the step S1502, AddressCount is set to JobCopies in a step S1503. This means that jobs corresponding to the number of destinations are generated to transmit jobs with different cover sheets attached thereto (facsimile transmission data) to respective destinations. If CoverType is not set to 1 in the step S1502, that is, if CoverType is set to 0 (i.e. no cover sheet is attached to facsimile transmission data) or 2 (i.e. facsimile transmission data with the same cover sheet attached thereto are transmitted to all destinations), the same job is transmitted to all destinations. Therefore, the maximum number of destinations (AddressMax) to which data can be transmitted in a single job is acquired in a step S1504, and the minimum required number of jobs is calculated in a step S1505 and the resulting value is set to JobCopies. Note that the operator "/" means that an integer with the remainder rounded down is used.

The printer driver 203 of the personal computer 3000 holds, as preset fixed value data, the maximum number of destinations of the multifunction apparatus 4000 connected to the personal computer 3000, or acquires the maximum number of destinations from the multifunction apparatus 4000 via the bi-directional interface 3012. In acquiring the maximum number of destinations, the maximum number of destinations may be directly acquired from the multifunction apparatus 4000, or data that affect the maximum number of destinations such as the memory capacity, disk capacity, etc. of the multifunction apparatus 4000 may be acquired and the maximum number of destinations may be determined by the printer driver 203 according to the acquired data.

When instructing the despooler 305 to despool in the step S1304 in FIG. 13, the spool file manager 304 forwards the variable K, which represents the number of times the despooling has been carried out, and CoverType representing the setting as to attachment of cover sheets to the despooler 305.

Figure 16:
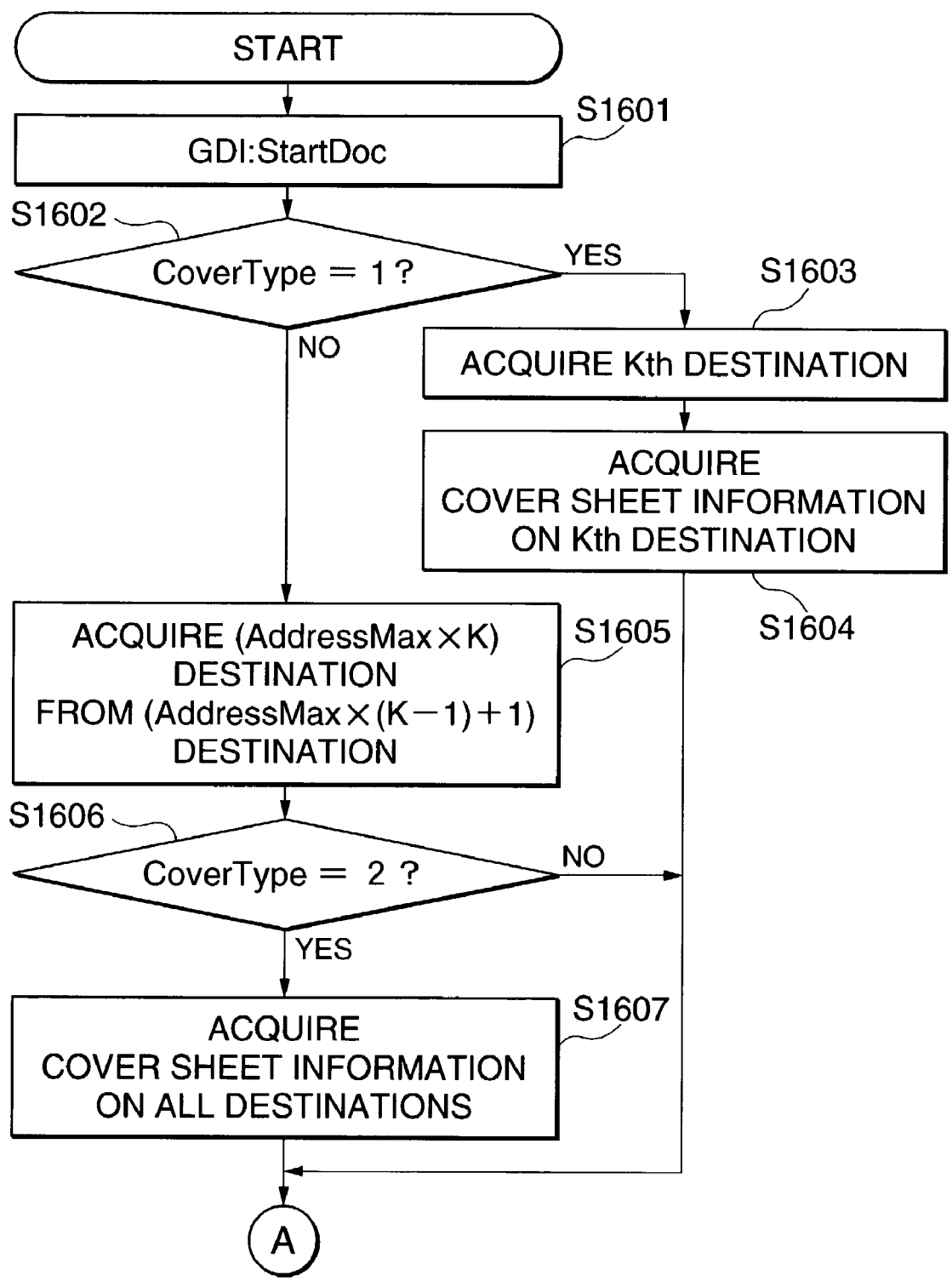
FIG. 16 is a flow chart showing the procedure of operations performed by a despooler of the information processing apparatus.
Figure 17:
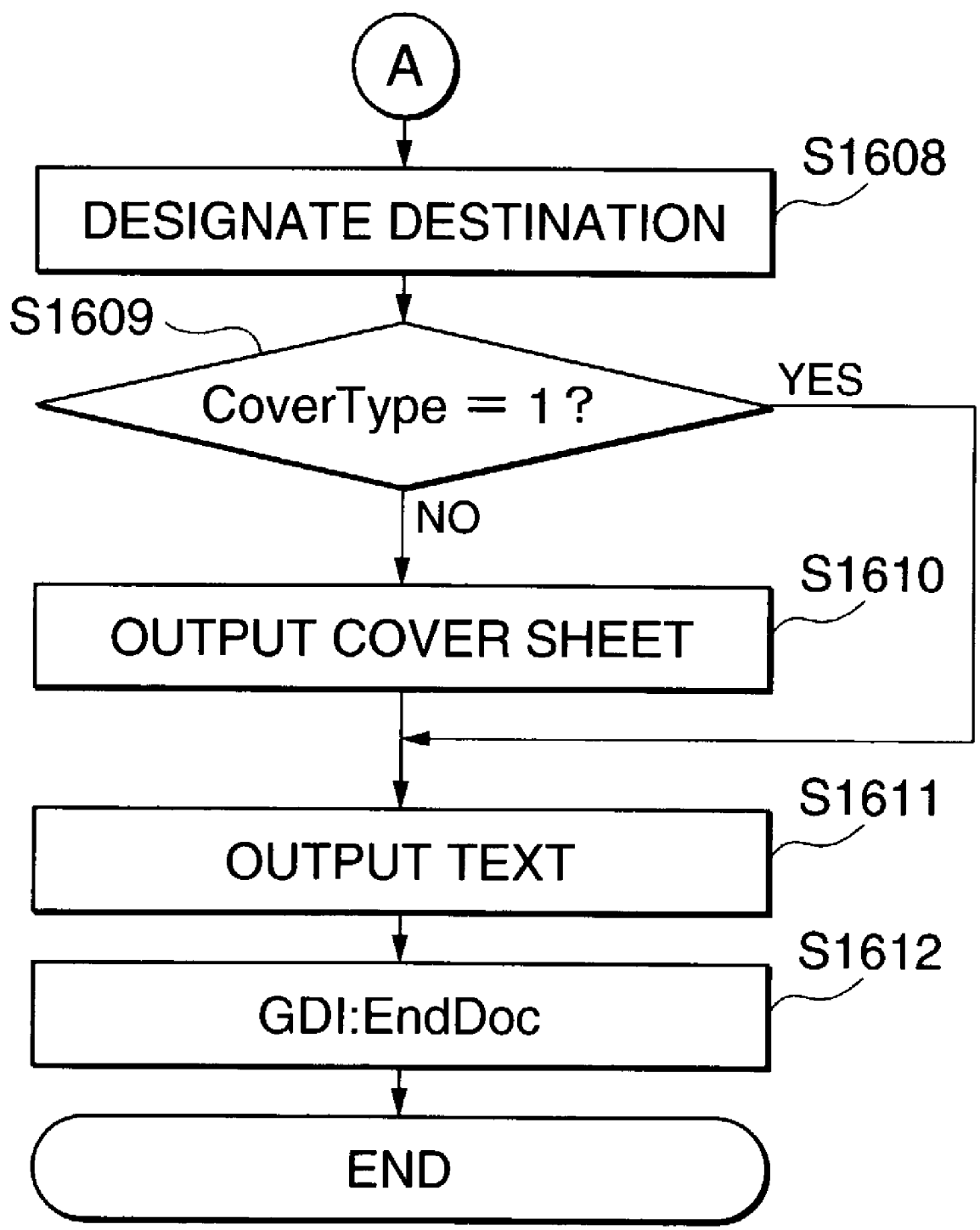
FIG. 17 is a flow chart showing a continued part of the procedure of operations performed by the despooler.

FIGS. 16 and 17 are flow charts showing the Kth despooling process carried out by the despooler 305 in accordance with the instruction from the spool file manager 304 in the step S1304 in FIG. 13 in the personal computer 3000. The CPU 3001 causes the printing control system in FIG. 3 to execute the processing of these flow charts according to a program stored in the program ROM 3003b of the ROM 3003. First, in a step S1601, the despooler 305 issues an instruction for starting printing (GDI:StartDoc) to the dispatcher 301 via the graphic engine 202. The dispatcher 301 determines whether DDI received from the graphic engine 202 is one converted from GDI issued by the application 201 by the graphic engine 202, or one converted from DGI issued by the despooler 305 by the graphic engine 202. If it is determined that DDI is one converted from the GDI issued from the despooler 305 to the graphic engine 202, the dispatcher 301 loads the printer driver 203 stored in the external memory 3011 into the RAM 3002, and issues a printing instruction to the printer driver 203.

In steps S1602 to S1607, destinations (e.g. telephone numbers (facsimile numbers) of destinations) and cover sheet information (e.g. cover sheet size, and drawing contents of cover sheets) are acquired together with the setting as to the cover sheets (CoverType). If CoverType is set to 1

(i.e. facsimile transmission data with different cover sheets are transmitted to respective destinations), the number of divided jobs (JobCopies) corresponds to the number of destinations (AddressCount) as shown in the step S1503 in FIG. 15, and the processing in the step S1304 in FIG. 13 is repeated the number of times corresponding to the number of destinations (AddressCount). Namely, in the Kth despooling process, a cover sheet for the Kth destination is transmitted to the Kth destination.

Therefore, if it is determined in the step S1602 that CoverType is set to 1 (i.e. facsimile transmission data with different cover sheets attached thereto are transmitted to respective destinations), the Kth destination is acquired in the step S1603, and cover sheet information on the Kth destination is acquired in the step S1604. The despooler 305 acquires the destination and the cover sheet information from the printer driver 203. The printer driver 203 retrieves the Kth destination from the destination information included in information on the corresponding job in the job setting section of the facsimile information file 306 and returns it to the despooler 305. The printer driver 203 returns cover sheet drawing data on the corresponding job to the despooler 305.

FIGS. 19A and 19B shows the contents of the cover sheet information. A cover sheet setting section includes settings as to the sheet size of a cover sheet. That is, CoverPageOption (cover sheet option), CoverPageSize (cover sheet size), and Template (cover sheet template) are set in the cover sheet setting section. A template for the cover sheet is specified as the Template. This is a template that is designated as the type of page during setting as to cover sheets via the facsimile transmission setting window in FIG. 9. Drawing data that does not vary according to destinations among data to be drawn on the cover sheet is defined in the template, and the contents of the template are stored in the same intermediate code format as the contents of the spool file 303. The contents of the spool file 303 may be stored in an ordinary meta file (a file that defines a file) using which the despooler 305 may draw data.

A drawing data object section includes information such as a sender, destination, logo, and comment. This information is information on drawing objects specified from a dialogue box in FIG. 9. Since the information relating to other objects except for the destination is common to all the divided jobs, necessary information is read out from cover sheet data on the corresponding job in the job setting section of the facsimile information file 306, and is written into the drawing object section. With respect to the destination, the name, facsimile number, company name, and department or division name of the destination of the divided jobs are read out from the address book database section of the facsimile information file 306 and are written into the drawing object section. In this way, the printer driver 203 generates the cover sheet information and returns it to the despooler 305.

On the other hand, if it is determined in the step S1602 that CoverType is not set to 1, that is, it is determined in the step S1602 that CoverType is set to 0 or 2, a plurality of destinations to be designated are acquired in a step S1605. Since the number of destinations to which data can be transmitted in one despooling process is AddressMax, a destination to which data is transmitted in the Kth despooling process is the (AddressMax×K)th destination from the ((AddressMax×(K−1))+1)th destination. The despooler 203 acquires the destination from the printer driver 203. The printer driver 203 retrieves the (AddressMax×K)th destination from the ((AddressMax×(K−1))+1)th destination from the destination information included in information corresponding to the job in the job setting section of the facsimile information file 306, and returns it to the despooler 305. In the last job, however, the printer driver 203 retrieves the ((AddressMax×(K−1))+1)th destination to the last destination, and returns them to the despooler 305.

If it is determined in a step S1606 that CoverType is set to 2 (i.e. facsimile transmission data with the same cover sheet attached thereto are transmitted to all destinations), the same cover sheet is transmitted to all destinations, and thus, cover sheet information on all destinations is acquired in a step S1607. The despooler 305 acquires the cover sheet information from the printer driver 203. The printer driver 203 returns cover sheet drawing data included in information on the corresponding job in the job setting section of the facsimile information file 306 and cover sheet drawing data relating to destinations included in the address book database section of the facsimile information file 306 to the despooler 305. If it is determined in the step S1606 that CoverType is not set to 2, no cover sheet information is acquired since CoverType is set to 0 (i.e. no cover sheet is attached to facsimile transmission data).

In a step S1608, the despooler 305 gives an instruction relating to a destination to the printer driver 203. In response to this instruction, the printer driver 203 starts producing facsimile transmission data that is to be transmitted to the multifunction apparatus 4000. FIG. 18 shows the contents of the facsimile transmission data. A transmission data job control section in FIG. 18 is comprised of an output destination and a telephone number, and a drawing data section is comprised of a job starting instruction, a page starting instruction, cover sheet drawing data, a page ending instruction, a page starting instruction, a drawing instruction 1, and the like. The printer driver 203 acquires a telephone number from the facsimile information file 306 according to the destination information specified by the despooler 305 to generate data of the job control section in FIG. 18. The generated data is transmitted to the multifunction apparatus 4000 via the system spooler 204.

In a step S1609, it is determined whether there is any cover sheet to be outputted. If there is any cover sheet to be outputted, cover sheet data is outputted from the despooler 305 to the printer driver 203 via the graphic engine 202, based on the cover sheet information acquired in the step S1604 or S1607. If CoverPageOption is set to 0 (the sheet size of top page) in the cover sheet setting section in FIGS. 19A and 19B, the despooler 305 reads out a page setting identifier of the first page from the drawing object information section of the spool file 303, and retrieves the corresponding page setting from the page setting information section to acquire the sheet size of the top page and define it as the sheet size of the cover sheet. On the other hand, if CoverPageOption is set to 1 (the sheet size designated as CoverPageSize), the sheet size represented by the paper ID designated as CoverPageSize in the cover sheet setting section is set as the sheet size of the cover sheet.

The despooler 305 carries out drawing by expanding or reducing the drawing data included in the template according to the sheet size of the cover sheet. On this occasion, the despooler 305 also expands or reduces drawing data included in the drawing object section in the cover sheet information.

It should be noted that after the step S1610, the despooler 305 outputs original data (facsimile transmission data) to the printer driver 203 via the graphic engine 202 in a step S1611, and issues an instruction for ending printing to the dispatcher 301 via the graphic engine 202 in a step S1612.

Figure 20A:
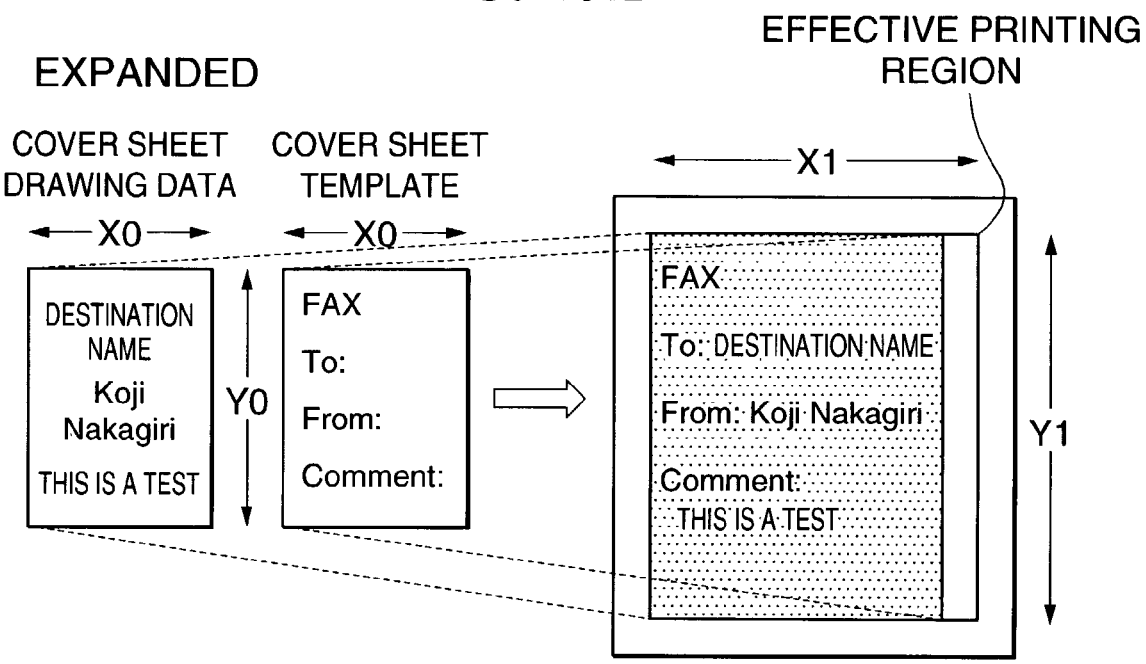
Figure 20B:
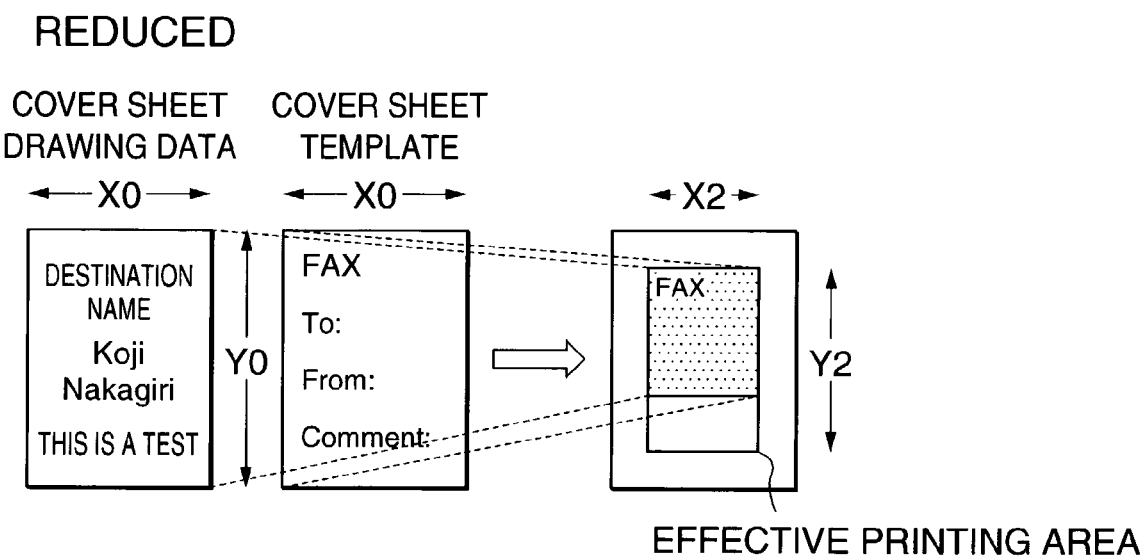

FIGS. 20A and 20B are diagrams useful in explaining how the despooler 305 of the personal computer 3000 carries out drawing of data, wherein FIG. 20A shows the case where the drawing data is expanded and FIG. 20B shows the case where the drawing data is reduced. Once the size of the cover sheet has been determined, the despooler 305 acquires the size of an effective printing area of the corresponding sheet from the printer driver 203. In FIGS. 20A and 20B, "X0" and "Y0" indicate the size of Template, and "X1", "Y1", "X2", and "Y2" indicate effective printing areas of a sheet that is actually outputted. The despooler 305 calculates the expansion and reduction ratio represented by the following expression:

$$Min(X/X0, Y/Y0)$$

where the operator "Min" indicates that the smaller numerical value in parentheses is used, and the operator "/" indicates that the real value is used.

As a result of the operation, data drawn on Template is expanded or reduced to a rectangular size in FIG. 20A or 20B (a shaded area). This rectangular size means the maximum size in which data can be drawn without changing the aspect ratio with respect to the effective printing area of an output destination. In the example in FIG. 20A or 20B, an expanded or reduced rectangular region of objects to be outputted is arranged in contact with a left edge or an upper edge of the effective printing area, but it may be centered vertically and horizontally.

In this manner, the expansion and reduction ratio found by the above operation is applied to the position and size of each object included in Template to thereby draw all the objects in the determined ectangular region of the sheet to be outputted.

For example, if an upper left position is an origin in both Template and the effective printing area in the example of 20A or 20B, the coordinates and size of each object is multiplied by the expansion or reduction ratio found by the above operation to thus find the coordinates and size of the object to be outputted. The printer driver 203 receives such cover sheet drawing instructions, and generates cover sheet drawing data in the drawing data section of transmission data in FIG. 18 and transmits it to the multifunction apparatus 4000.

In a step S1611, the despooler 305 instructs the printer driver 203 to draw drawing objects of all pages included in the drawing object information section of the spool file 303 (refer to FIGS. 12A and 12B) via the graphic engine 202 and the dispatcher 301. On this occasion, if PaperSizeOption in the job setting information section of the spool file 303 (refer to FIGS. 12A and 12B) is set to 0 (the sheet size of each page), data is outputted to a sheet of the sheet size indirectly designated by DevModeID relating to each page in the drawing object information section.

If PaperSizeOption is set to 1 (the sheet size of the top page), data of each page is expanded or reduced to be outputted on sheets of the sheet size designated by DevModeID relating to the top page in the drawing object information section. If PaperSizeOption is set to 2 (the sheet size designated as PaperSize), data of each page is expanded or reduced to be outputted on sheets of the sheet size indicated by the sheet ID designated as PaperSize in the job setting information section. The expansion or reduction is carried out such that drawing objects of each page are expanded or reduced to be outputted in the same manner as in the case where the cover sheet is expanded or reduced to be outputted. The printer driver 203 receives such drawing instructions and generates drawing data of each page in the drawing data section of the transmission data in FIG. 18 and transmits it to the multifunction apparatus 4000.

The external device 4300 of the multifunction apparatus 4000 having received the transmission data in FIG. 18 from the printer driver 203 of the personal computer 3000 via the system spooler 204 expands the transmission data into image information by the formatter 4305 according to the contents of the drawing data section of the transmission data. If facsimile transmission is designated as output destination in the output destination information of the job control section of the transmission data, the expanded image information as well as the telephone number in the job control section are transferred to the facsimile section 4301. The facsimile section 4301 transmits the designated image information to the designated destination. If other destination than the facsimile transmission is designated as the output destination, the expanded data is transferred to the designated output destination (to the printer section 4200 for print out, or to the hard disk 4308 for storage).

Figure 22:
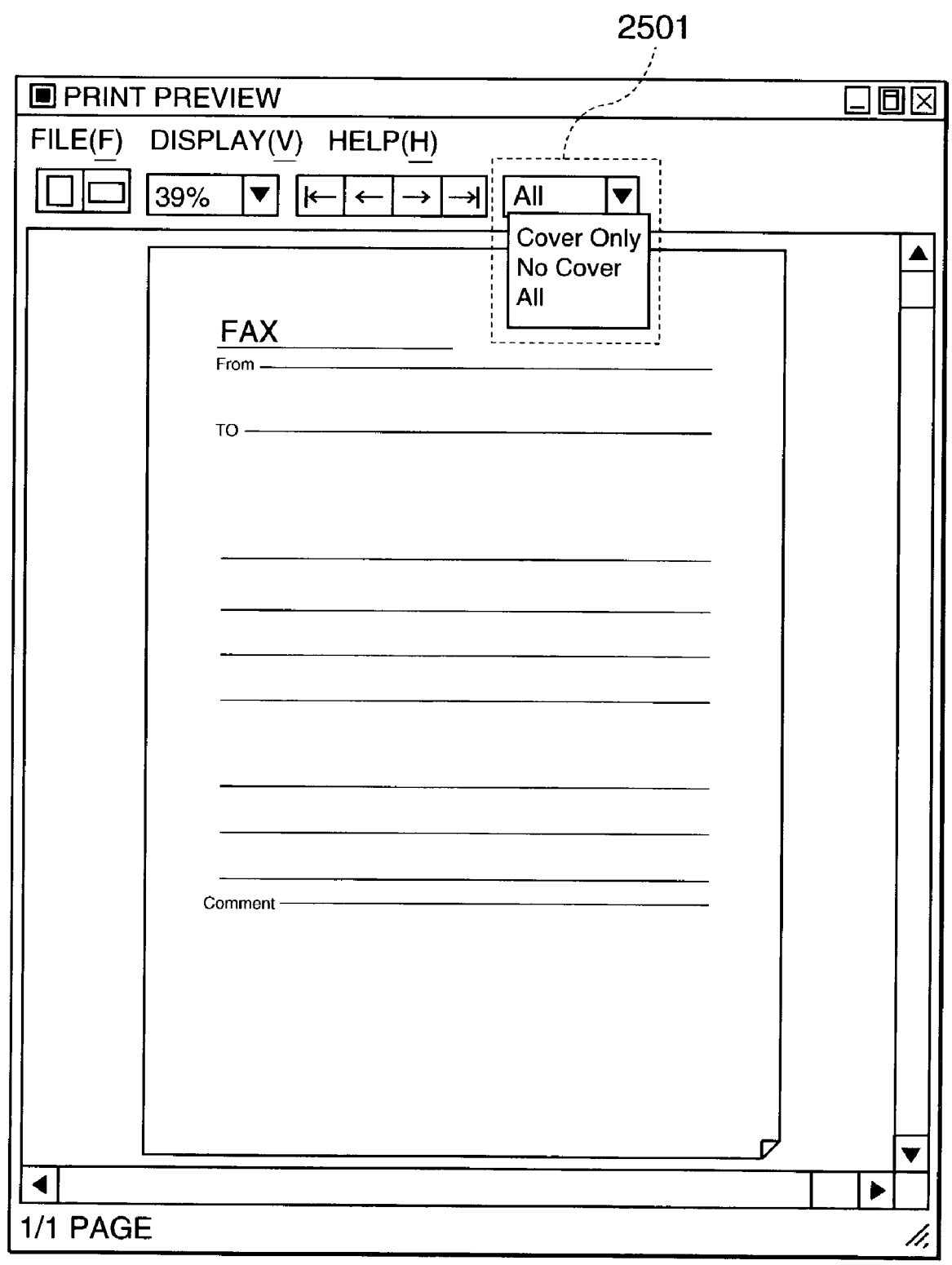
FIG. 22 is a diagram showing a GUI control screen that selects preview modes.

A description will now be given of an example of a screen in the case where the data transmitted from the personal computer 3000 is previewed before it is transmitted to the multifunction apparatus 4000 by facsimile transmission through a telephone line. Preview settings are made in the same manner as in the normal printing using a GUI (Graphical User Interface) screen in FIG. 21. FIG. 22 shows an example of a preview screen that is activated upon setting of preview.

In a GUI shown in FIG. 22, a preview mode setting control 2501 is provided on the screen, so that one display mode can be selected from the following three modes: "cover sheet only", "facsimile transmission data only", and "both cover sheet and facsimile transmission data". The display mode of the preview screen provided by the previewer 308 is changed by operating the preview mode setting control 2501.

Figure 23:
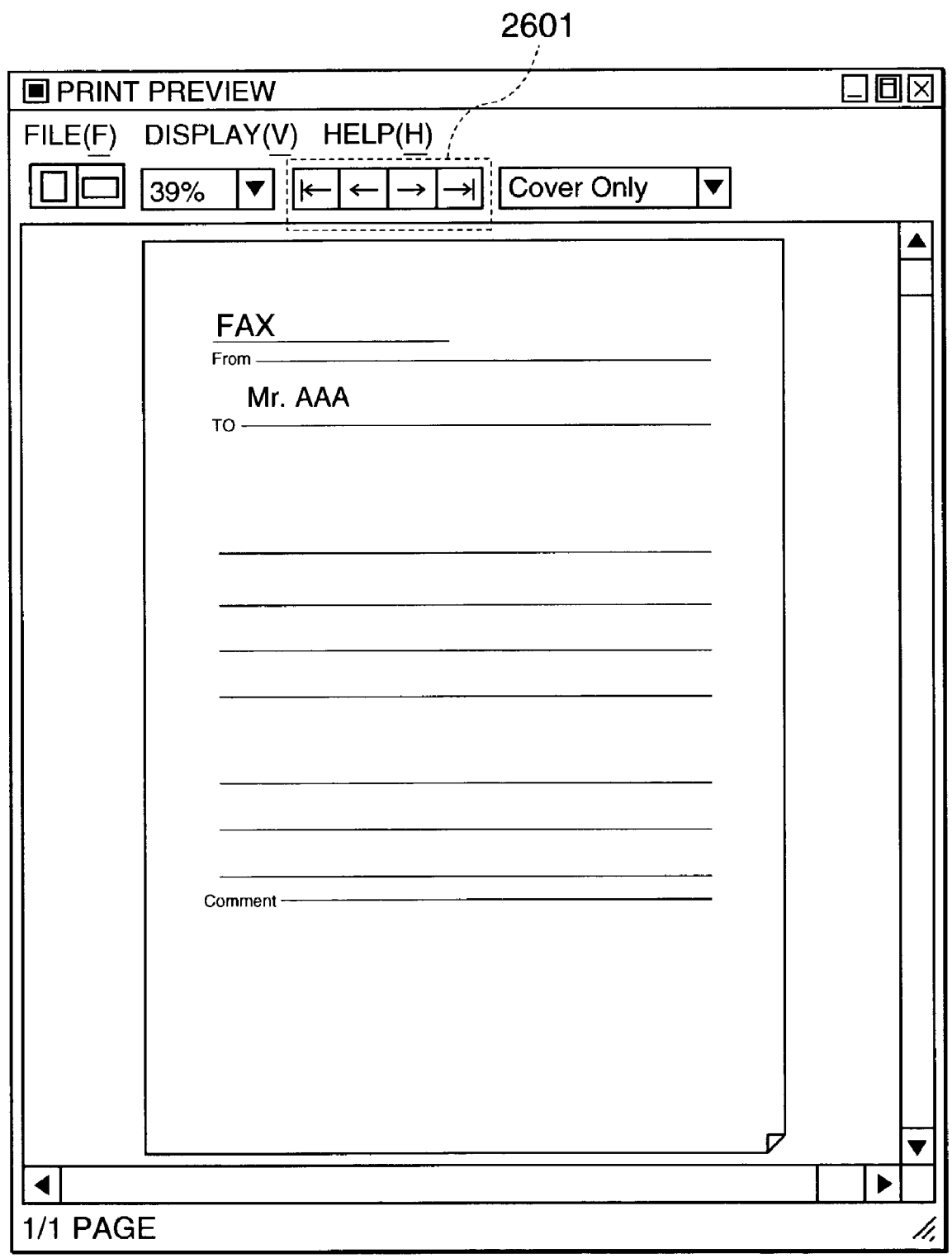
FIG. 23 is a diagram showing a GUI control screen that selects addresses.
Figure 24:
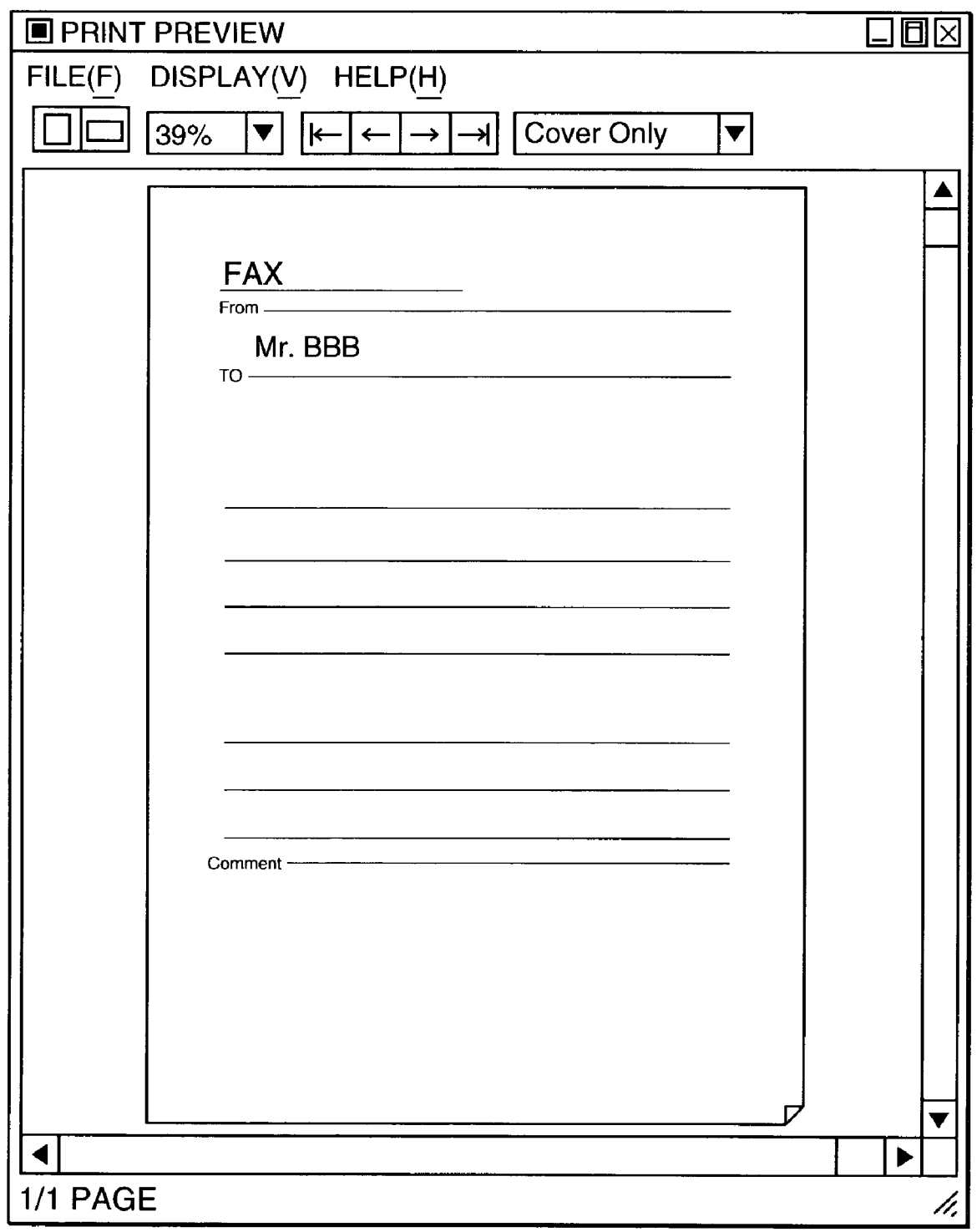
FIG. 24 is a diagram showing a GUI control screen that selects destinations.

FIGS. 23 and 24 show examples of preview screen in the case where the display mode "cover sheet only" is selected. In FIG. 23, a record forwarding control 2601 is displayed on the screen, so that cover sheets to be transmitted can be sequentially displayed correspondingly to destinations by pressing a rightward arrow key and a leftward arrow key. FIG. 24 shows the case where another destination is displayed, so that a change in the destination name can be confirmed on the preview screen. The display mode "facsimile transmission data only" is the same as the normal preview display mode, and therefore a description thereof is omitted herein.

Figure 25:
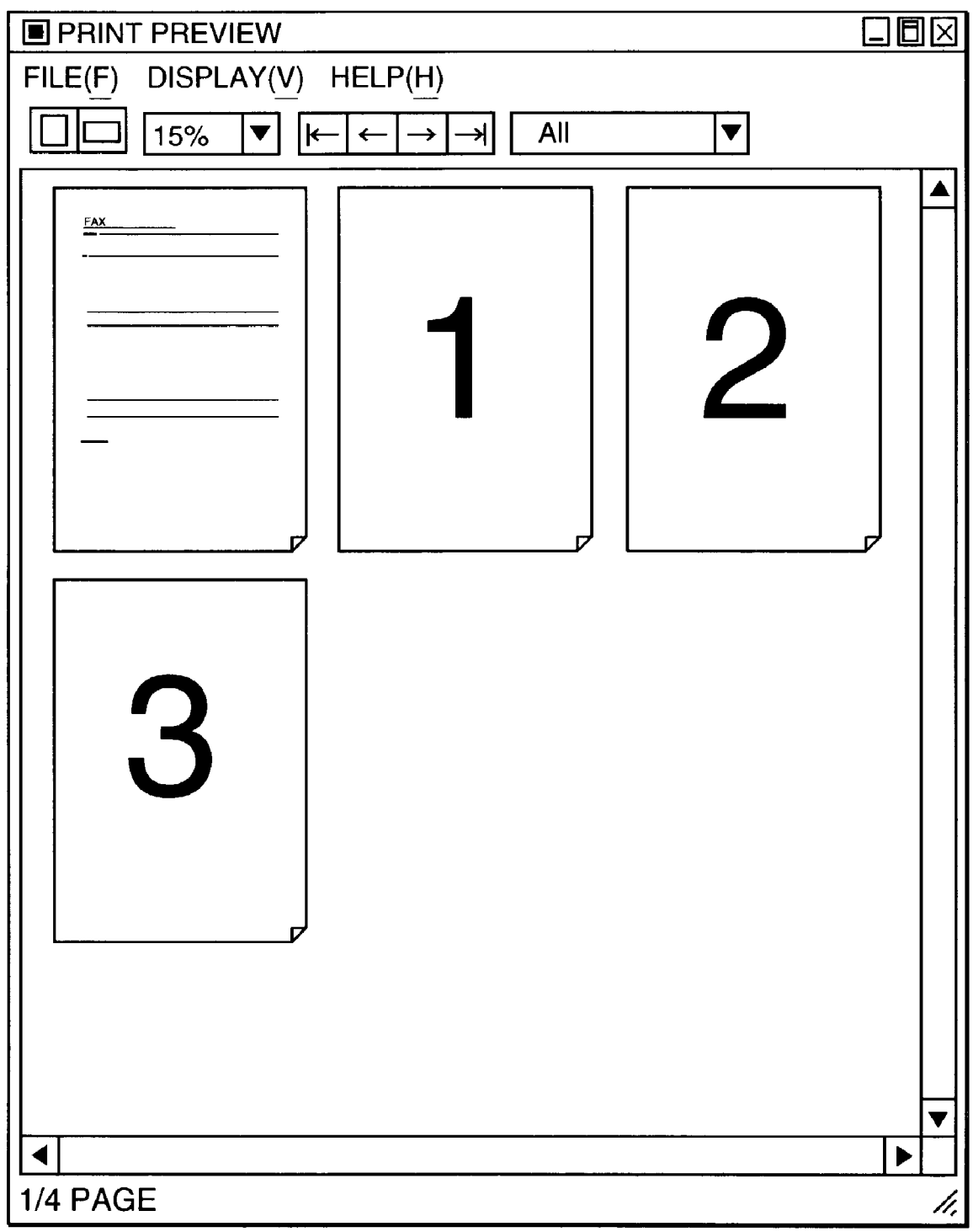
FIG. 25 is a diagram showing a display format for previewing both text data and a cover sheet.
Figure 26:
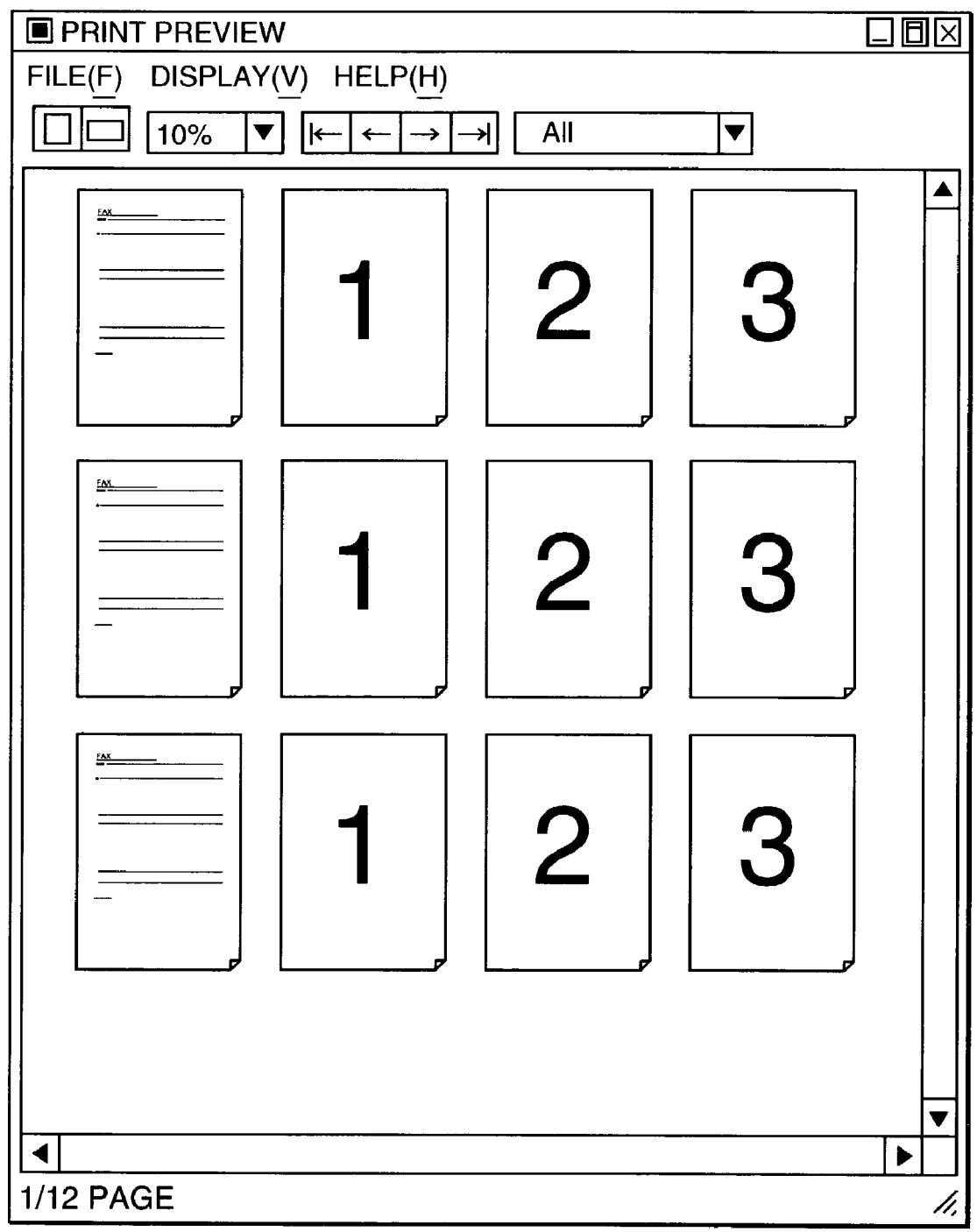
FIG. 26 is another example of display format for previewing both text data and a cover sheet.

FIGS. 25 and 26 show examples in which both "cover sheet and facsimile transmission data" are displayed. Facsimile transmission data of three pages shown in FIG. 25 are data to which are assigned large-sized sequential numbers. Four pages including a cover sheet (at an upper left location on the screen) are displayed on the screen in FIG. 25. On this screen as well, by pressing a rightward arrow key and/or a leftward arrow key, a combination of a cover sheet and facsimile transmission data can be displayed which correspond to the next destination. If facsimile transmission data with different cover sheets attached thereto are transmitted to respective destinations, data relating to the respective destinations may be sequentially switched to be displayed. In the example in FIG. 26, as is distinct from the example of FIG. 25, data is not sequentially switched and displayed according to destinations by switching data to be displayed by operating a rightward arrow key and/or a leftward arrow key, but data to be transmitted to all destinations are simultaneously displayed in rows. In this way, the display mode of cover sheets and the facsimile transmission data can be selectively set to any of a plurality of display formats. The spool file manager 304 in FIG. 3 carries out the above-described display control of cover sheets and facsimile transmission data.

The previewer 308 controls the preview mode setting control 2501 and the record forwarding control 2601 to show the user the possibility of previewing in a plurality of display formats so that the display mode can be changed according to the settings as to the cover sheets by the user.

Figure 27:
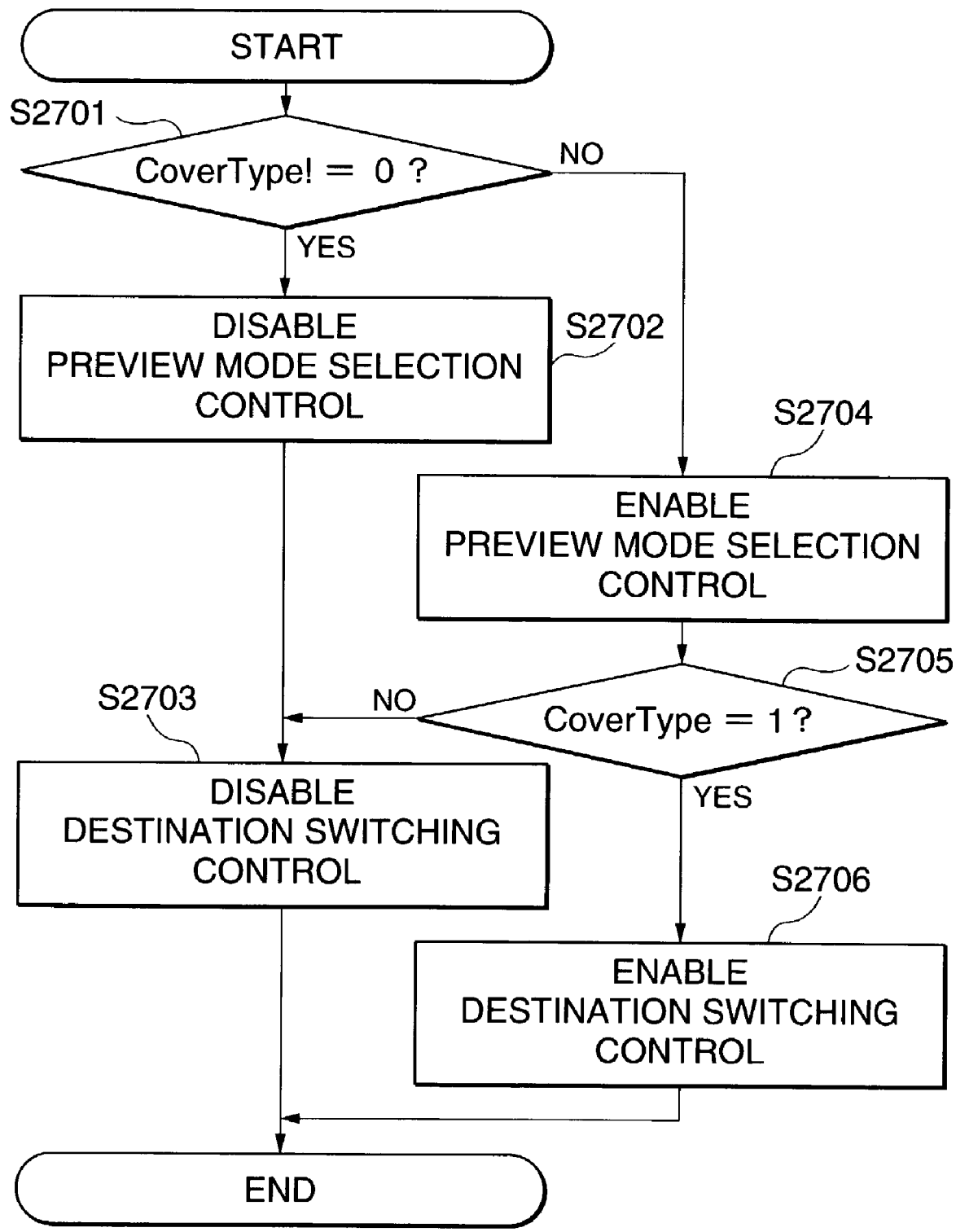
FIG. 27 is a flow chart showing a GUI control process carried out by a previewer of the information processing apparatus.

FIG. 27 is a flow chart of a process for controlling the preview mode setting control 2501 and the record forwarding control 2601 by the previewer 308 of the personal computer 3000. The CPU 3001 causes the printing control system in FIG. 3 to execute the present process according to a program stored in the program ROM 3003b of the ROM 3003. In a step S2701, the previewer 308 acquires cover sheet information from the facsimile information file 306, and determines how CoverType is set. If CoverType is set to 0 (i.e. no cover sheet is attached to facsimile transmission data), the process proceeds to a step S2702. In the step S2702, since no cover sheet is attached to facsimile transmission data and hence it is not necessary to change the preview mode, the preview mode setting control 2501 in FIG. 22 is disabled. The process then proceeds to a step S2703.

On the other hand, if it is determined in the step S2701 that CoverType is not to set 0 (i.e. cover sheets are attached to facsimile transmission data), the process proceeds to a step S2704. In the step S2704, the preview mode setting control 2501 is enabled, and the process then proceeds to a step S2705. In the step S2705, it is determined whether CoverType is set to 1 (i.e. facsimile transmission data with different cover sheets attached thereto are transmitted to respective destinations) or not.

If it is determined in the step S2705 that CoverType is set to 2 (i.e., facsimile transmission data with the same cover sheet attached thereto are transmitted to all destinations), the process proceeds to the step S2703. In the step S2703, disabled is the record forwarding control 2601 in FIG. 23 which causes different cover sheets to be sequentially switched and displayed according to destinations. On the other hand, if it is determined in the step S2705 that CoverType is set to 1 (i.e., facsimile transmission data with different cover sheets attached thereto are transmitted to respective destinations), the process proceeds to a step S2706. In the step S2706, the record forwarding control 2601 is enabled.

Figure 28:
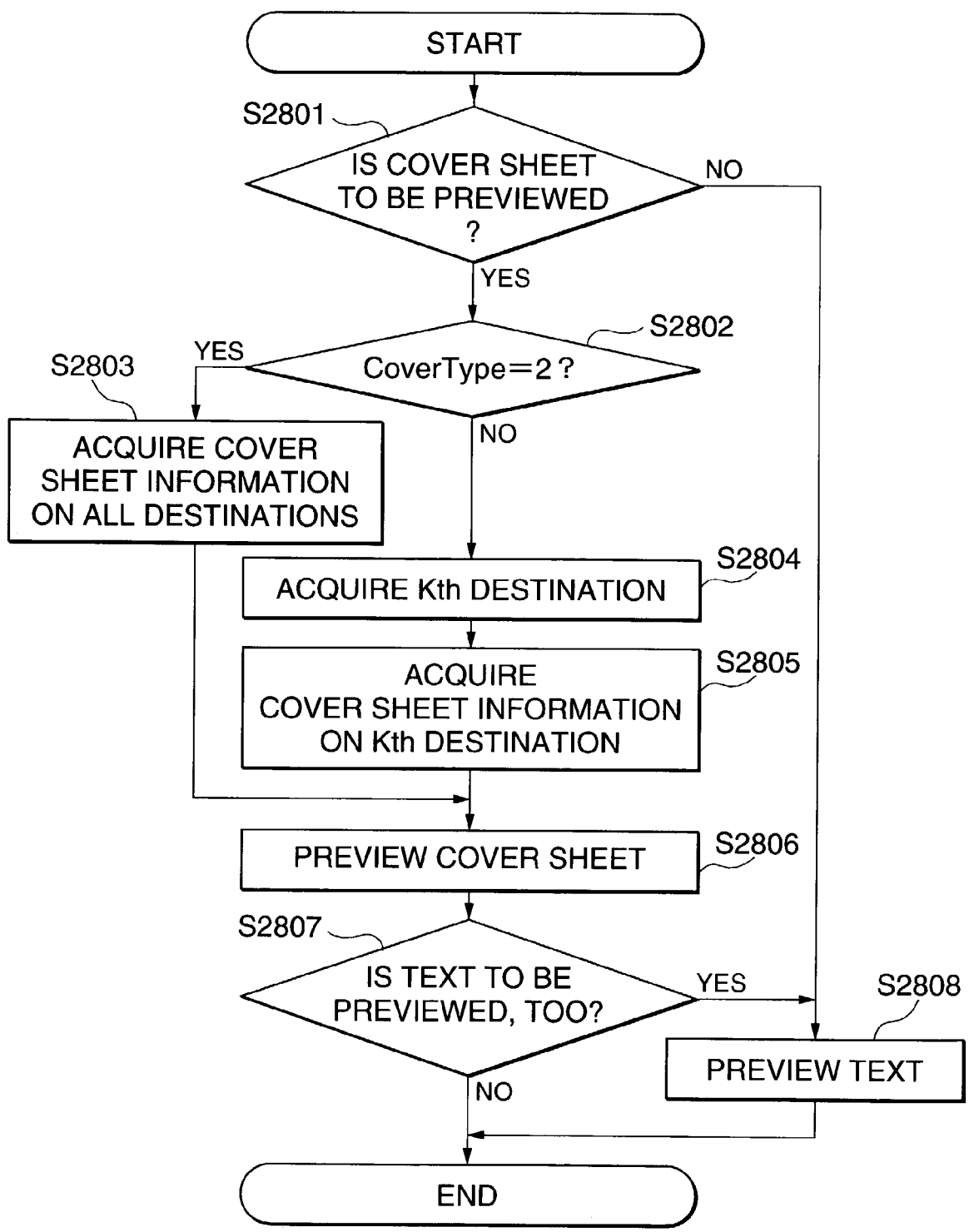
FIG. 28 is a flow chart showing a previewing process carried out in accordance with the preview mode of the previewer.

FIG. 28 is a flow chart of processing for changing the display format according to the display mode of the previewer 308 of the personal computer 3000. The CPU 3001 causes the printing control system to execute the processing of this flow chart according to a program stored in the ROM 3003b of the ROM 3003. The example in FIG. 28 assumes that the GUI is controlled by the processing in FIG. 27 such that no setting is made for previewing the cover sheet if there is no cover sheet that is to be attached to facsimile transmission data. In a step S2801, the previewer 308 checks whether the current display mode is a display mode that allows display of cover sheets. If the current display mode is the display mode that allows display of cover sheets in the step S2801, the process proceeds to a step S2802. On the other hand, if the current display mode is not the display mode that allows display of cover sheets in the step S2801, the process proceeds to a step S2808.

In the step S2802, cover sheet settings in the facsimile information file 306 are checked. Namely, it is determined in the step S2808 whether CoverType is set to 2 (i.e. facsimile transmission data with the same cover sheet attached thereto are transmitted to all destinations). If it is determined in the step S2802 that CoverType is set to 2, the process proceeds to a step S2803. In the step S2803, cover sheet information common to all destinations is acquired, and the process then proceeds to a step S2806. On the other hand, if it is determined in the step S2802 that CoverType is not set to 2, the process proceeds to the step S2804 wherein destination information corresponding to the current destination designated by the record forwarding control 2601 is acquired. The process then proceeds to a step S2805 wherein cover sheet information corresponding to the current destination is acquired, and the process then proceeds to the step S2806.

In the step S2806, the previewer 308 previews a cover sheet. In the next step S2807, it is determined whether original data in data that is transmitted to the multifunction apparatus 4000 for facsimile transmission by the personal computer 3000 (comprised of original data and the cover sheet) is also to be previewed or not. If it is determined in the step S2807 that the original data is to be previewed, the process proceeds to the step S2808. In the step S2808, the original data is previewed. If it is determined in the step S2807 that the original data is not to be previewed, the processing is terminated without previewing the original data.

As described above, if the multifunction apparatus 4000 has received the data from the personal computer 3000, it transmits cover sheets different according to destinations and original data common to all the destinations to respective destinations by facsimile transmission through a telephone line according to the known facsimile transmission procedure.

It goes without saying that preview processing in the case where the multifunction apparatus 4000 produces multiple prints, i.e. a plurality of copies, is carried out by previewing only one set of print data as in the case where the multifunction apparatus 4000 produces only one print or copy. However, in the case where ones equivalent to cover sheets differing according to sets are printed, print data may be previewed in the same manner as in the above-described broadcast transmission of data with cover sheets attached thereto.

As described above, according to the information processing system of the present embodiment, the personal computer 3000 as the information processing apparatus is comprised of the spooler 302 that temporarily stores facsimile transmission data to be transmitted to the multifunction apparatus 4000 in the intermediate code format in the spool file 303, the despooler 305 that generates final facsimile transmission data to be transmitted to the multifunction apparatus 4000 from the data stored temporarily in the intermediate code format, the printer driver 203 that attaches cover sheets to jobs (facsimile transmission data) and acquires drawing data of a cover sheet for each job, the previewer 308 that previews the facsimile transmission data and the cover sheet, and the spool file manager 304 that controls preview display of the previewer 308 according to setting information acquired from the data stored in the intermediate code format and the preview method selected on the CRT 3010, whereby the effects as described below can be obtained.

In the case where facsimile transmission data with cover sheets attached thereto are previewed before they are transmitted from the personal computer 3000 to the multifunction apparatus 4000, cover sheets and facsimile transmission data (original data) can be previewed in a manner not giving a sense of incompatibility to the conventional display and operating methods used for previewing printing data in producing multiple prints.

Although in the above described embodiment, the electrophotographic printing is adopted as the printing method executed by the multifunction apparatus, there is no intention to limit the invention to this. For example, the present invention may be applied to a variety of printing methods such as ink-jet printing, thermal transfer, thermal printing, electrostatic printing, and discharge breakdown printing.

Further, although in the above described embodiment, one information processing apparatus and one multifunction apparatus are connected to each other in the system shown in FIG. 4 to realize communication therebetween, this is not limitative, but the present invention may be applied to a system in which an arbitrary number of information processing apparatuses and an arbitrary number of multifunction apparatuses are connected to each other.

Further, although in the above described embodiment, the multifunction apparatus having the image reading function, the image forming function, and the facsimile communicating function is used as an apparatus that communicates with the information processing apparatus, this is not limitative, but the present invention may also be applied to an image forming apparatus (printer) having an image forming function and a facsimile communicating function, an image reading apparatus (reader) having an image reading function and a facsimile communicating function, apparatus having another function and a facsimile function, and an apparatus having only a facsimile function.

Further, although the above description is directed to an embodiment in which data with cover sheets attached thereto are transmitted via facsimile to a plurality of destinations through broadcast communication, the same effects may be achieved by transmitting data in other ways than facsimile transmission.

The present invention may either be applied to a system composed of a plurality of apparatuses (e.g. a host computer, interface equipment, a reader, and a printer) or to a single apparatus (e.g. a copying machine, a printer, a facsimile machine, or the like).

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and hence the storage medium on which the program code is stored constitutes the present invention. Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM.

Further, it is to be understood that the functions of the above described embodiment may be accomplished not only by executing a program code read out by a computer, but also by causing an OS (Operating System) or the like which operates on the computer to perform a part or all of the actual operations based on instructions of the program code.

Further, it is to be understood that the functions of the above described embodiment may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An information processing apparatus having preview control for supplying jobs to an image processing apparatus having at least a facsimile communicating function, comprising:

a job generating unit that generates jobs for facsimile transmission to be supplied to the image processing apparatus;

a cover sheet attaching unit that attaches cover sheets to the jobs;

a drawing data acquiring unit that acquires drawing data of the cover sheets for respective ones of the jobs;

a selector that selects one display mode of a plurality of display modes for previewing at least one of facsimile transmission data that constitutes the jobs to be transmitted by the image processing apparatus or the cover sheets attached by said cover sheet attaching unit, the plurality of display modes including a no-cover previewing mode for previewing the facsimile transmission data, a cover-only previewing mode for previewing the cover sheets, an all-previewing mode for previewing both of the facsimile transmission data and the cover sheets;

a preview unit that previews at least one of the facsimile transmission data or the cover sheets; and a preview display controller that controls preview display of said preview unit according to a cover sheet previewing mode, which is the cover-only previewing or all-previewing mode, for previewing at least the cover sheets selected as the display mode by said selector, wherein said preview display controller comprises a data changing unit that changes at least cover sheets to be displayed according to destinations for the facsimile transmission in accordance with a user's manual designation in a case where said selector selects the cover sheet previewing mode and different cover sheets are to be attached to the facsimile transmission data according to the destinations by said cover sheet attaching unit, and said preview display controller controls preview display of said preview unit to change and display the cover sheets according to the destinations using said data changing unit.

2. An information processing apparatus according to claim 1, comprising:

a spool unit that temporarily stores the facsimile transmission data to be supplied to the image processing apparatus in an intermediate code format; and a despool unit that generates final facsimile transmission data to be supplied to the image forming apparatus, from the data temporarily stored in the intermediate code format; and wherein said preview display controller controls preview display of said preview unit according to setting information acquired from the data stored in the intermediate code format and the display mode selected by said selector.

3. An information processing apparatus according to claim 1, wherein said data changing unit changes and displays both of the cover sheets and the facsimile transmission data according to the destinations.

4. An information processing apparatus according to claim 1, wherein said data changing unit changes at least cover sheets to be displayed according to the destinations one by one in accordance with the user's manual designation.

5. An information processing system including an image processing apparatus having at least a facsimile communicating function, and an information processing apparatus having preview control for supplying jobs to said image processing apparatus, said information processing apparatus comprising:
- a job generating unit that generates jobs for facsimile transmission to be supplied to the image processing apparatus;
- a cover sheet attaching unit that attaches cover sheets to the jobs;
- a drawing data acquiring unit that acquires drawing data of the cover sheets for respective ones of the jobs;
- a selector that selects one display mode of a plurality of display modes for previewing at least one of facsimile transmission data that constitutes the jobs to be transmitted by the image processing apparatus or the cover sheets attached by said cover sheet attaching unit, the plurality of display modes including a no-cover previewing mode for previewing the facsimile transmission data, a cover-only previewing mode for previewing the cover sheets, an all-previewing mode for previewing both of the facsimile transmission data and the cover sheets;
- a preview unit that previews at least one of the facsimile transmission data or the cover sheets; and
- a preview display controller that controls preview display of said preview device according to a cover sheet previewing mode, which is the cover-only previewing or all-previewing mode, for previewing at least the cover sheets selected as the display mode by said selector,
- wherein said preview display controller comprises a data changing unit that changes at least cover sheets to be displayed according to destinations for the facsimile transmission in accordance with a user's manual designation in a case where said selector selects the cover sheet previewing mode and different cover sheets are to be attached to the facsimile transmission data according to the destinations by said cover sheet attaching unit, and said preview display controller controls preview display of said preview unit to change and display the cover sheets according to the destinations using said data changing unit.

6. An information processing system according to claim 5, wherein said information processing apparatus comprises:
- a spool unit that temporarily stores the facsimile transmission data to be supplied to the image processing apparatus in an intermediate code format; and
- a despool unit that generates final facsimile transmission data to be supplied to the image forming apparatus, from the data temporarily stored in the intermediate code format; and
- wherein said preview display controller of said information processing apparatus controls preview display of said preview unit according to setting information acquired from the data stored in the intermediate code format and the display mode selected by said selector.

7. An information processing system according to claim 5, wherein said data changing unit of said information processing apparatus changes and displays both of the cover sheets and the facsimile transmission data according to the destinations.

8. An information processing system according to claim 5, wherein said data changing unit of said information processing apparatus changes at least cover sheets to be displayed according to the destinations one by one in accordance with the user's manual designation.

9. A preview control method of an information processing apparatus having preview control for supplying jobs to an image processing apparatus having at least a facsimile communicating function, comprising:
- a job generating step of generating jobs for facsimile transmission to be supplied to the image processing apparatus;
- a cover sheet attaching step of attaching cover sheets to the jobs;
- a drawing data acquiring step of acquiring drawing data of the cover sheets for respective ones of the jobs;
- a selecting step of selecting one display mode of a plurality of display modes for previewing at least one of facsimile transmission data that constitutes the jobs to be transmitted by the image processing apparatus or the cover sheets attached in said cover sheet attaching step, the plurality of display modes including a no-cover previewing mode for previewing the facsimile transmission data, a cover-only previewing mode for previewing the cover sheets, an all-previewing mode for previewing both of the facsimile transmission data and the cover sheets;
- a previewing step of previewing at least one of the facsimile transmission data or the cover sheets; and
- a preview display control step of controlling preview display in said previewing step according to a cover sheet previewing mode, which is the cover-only previewing or all-previewing mode, for previewing at least the cover sheets selected as the display mode in said selecting step,
- wherein said preview display control step comprises a data changing step of changing at least cover sheets to be displayed according to destinations for the facsimile transmission in accordance with a user's manual designation in a case where the cover sheet previewing mode is selected in said selecting step and different cover sheets are to be attached to the facsimile transmission data according to the destinations in said cover sheet attaching step, and in said preview display control step, preview display provided in said previewing step is controlled to change and display the cover sheets according to the destinations using said data changing step.

10. A preview control method according to claim 9, comprising:
- a spooling step of temporarily storing the facsimile transmission data to be supplied to the image processing apparatus in an intermediate code format; and
- a despooling step of generating final facsimile transmission data to be supplied to the image processing apparatus, from the data temporarily stored in the intermediate code format; and
- wherein said preview display control step comprises controlling preview display in said previewing step according to setting information acquired from the data stored in the intermediate code format and the display mode selected in said selecting step.

11. A preview control method according to claim 9, wherein said data changing step changes and displays both of the cover sheets and the facsimile transmission data according to the destinations.

12. A preview control method according to claim 9, wherein in said data changing step, at least cover sheets to be displayed according to the destinations are changed one by one in accordance with the user's manual designation.

13. A computer-readable storage medium containing a program for executing a preview control method of an information processing apparatus having preview control for supplying jobs to an image processing apparatus having at least a facsimile communicating function, said preview control method comprising:

- a job generating step of generating jobs for facsimile transmission to be supplied to the image processing apparatus;
- a cover sheet attaching step of attaching cover sheets to the jobs;
- a drawing data acquiring step of acquiring drawing data of the cover sheet for respective ones of the jobs;
- a selecting step of selecting one display mode of a plurality of display modes for previewing at least one of facsimile transmission data that constitutes the jobs to be transmitted by the image processing apparatus or the cover sheets attached in said cover sheet attaching step, the plurality of display modes including a no-cover previewing mode for previewing the facsimile transmission data, a cover-only previewing mode for previewing the cover sheets, an all-previewing mode for previewing both of the facsimile transmission data and the cover sheets;
- a previewing step of previewing at least one of the facsimile transmission data or the cover sheets; and
- a preview display control step of controlling preview display provided in said previewing step according to a cover sheet previewing mode, which is the cover-only previewing or all-previewing mode, for previewing at least the cover sheets selected as the display mode in said selecting step, wherein said preview display control step comprises a data changing step of changing at least cover sheets to be displayed according to destinations for the facsimile transmission in accordance with a user's manual designation in a case where the cover sheet previewing mode is selected in said selecting step and different cover sheets are to be attached to the facsimile transmission data according to the destinations in said cover sheet attaching step, and in said preview display control step, preview display provided in said previewing step is controlled to change and display the cover sheets according to the destinations using said data changing step.

14. A storage medium according to claim 13, wherein said preview control method comprises:

- a spooling step of temporarily storing the facsimile transmission data to be supplied to the image processing apparatus in an intermediate code format; and
- a despooling step of generating final facsimile transmission data to be supplied to the image forming apparatus, from the data temporarily stored in the intermediate code format; and
- wherein said preview display control step comprises controlling preview display in said previewing step according to setting information acquired from the data stored in the intermediate code format and the display mode selected in said selecting step.

15. A storage medium according to claim 13, wherein said data changing step changes and displays both of the cover sheets and the facsimile transmission data according to the destinations.

16. A storage medium according to claim 13, wherein in said data changing step, at least cover sheets to be displayed according to the destinations are changed one by one in accordance with the user's manual designation.

* * * * *